United States Patent [19]
Whipple et al.

[11] Patent Number: 5,917,905
[45] Date of Patent: Jun. 29, 1999

[54] TELEPHONE STATION EQUIPMENT EMPLOYING REWRITEABLE DISPLAY KEYS

[75] Inventors: David L. Whipple, Brentwood; Gerald B. Gulley, New Castle; Patrick F. Walsh, Nashua, all of N.H.

[73] Assignee: Intrinsic Solutions, Inc., Hampton Falls, N.H.

[21] Appl. No.: 08/800,310

[22] Filed: Feb. 14, 1997

Related U.S. Application Data

[63] Continuation-in-part of application No. 08/615,591, Mar. 12, 1996, Pat. No. 5,790,652.

[51] Int. Cl.$^6$ .................................................. H04M 1/00
[52] U.S. Cl. ...................... 379/356; 379/368; 379/387; 379/93.17; 379/93.05
[58] Field of Search ..................................... 379/356, 368, 379/433, 355, 354, 216, 93.17, 93.18, 93.19, 93.23, 93.05; 395/281, 282, 283, 284

[56] References Cited

U.S. PATENT DOCUMENTS

| | | | |
|---|---|---|---|
| 3,879,722 | 4/1975 | Knowlton . | |
| 4,763,356 | 8/1988 | Day, Jr. et al. | 379/368 |
| 4,885,580 | 12/1989 | Noto et al. | 341/23 |
| 4,928,306 | 5/1990 | Biswas et al. | 379/201 |
| 5,309,509 | 5/1994 | Cocklin et al. | 379/165 |
| 5,335,276 | 8/1994 | Thompson et al. | 380/21 |
| 5,335,329 | 8/1994 | Cox et al. | 395/325 |
| 5,402,477 | 3/1995 | McMahan et al. | 379/201 |

FOREIGN PATENT DOCUMENTS

| | | | |
|---|---|---|---|
| 0271280 | 6/1988 | European Pat. Off. | G06F 3/033 |
| 271 280 | 6/1988 | European Pat. Off. | G06F 3/033 |
| 365 200 | 4/1990 | European Pat. Off. | H04Q 11/04 |
| 42 03 652 | 8/1993 | Germany | G06F 3/037 |
| 4203652 | 8/1993 | Germany | G06F 3/037 |
| WO 96 02049 | 1/1996 | WIPO | G09G 5/00 |
| WO96/02049 | 1/1996 | WIPO | G09G 5/00 |

OTHER PUBLICATIONS

Telesis (Bell–Northern Research Ltd.), No. 97, Dec. 1993, Ottawa, L. Andreasen et al: "ADSI: The Dawn of a New Age of Interactive Services".

*Primary Examiner*—Jack Chiang
*Assistant Examiner*—Shih-Wen Hsieh
*Attorney, Agent, or Firm*—Gordon E. Nelson

[57] ABSTRACT

A telephone instrument with a 12-key keypad that has relegendable buttons. The telephone instrument is coupled to apparatus such as a personal computer, network server, or switch that is capable of performing telephony functions. The telephony apparatus responds to an input from the keypad by providing a new set of legends for the keys and/or performing a telephone function. In a preferred embodiment, the telephone instrument is connected both to a personal computer and to a POTS telephone circuit and includes a separate keypad for the POTS telephone circuit. The apparatus includes a component which detects a failure in the personal computer and automatically deactivates the keypad with the relegendable buttons, leaving the telephone instrument still available for use with the POTS circuit. Also disclosed are a reduced-cost implementation of the telephone instrument and alternative embodiments in which the telephone instrument is connected to the telephony apparatus by a packet interface or itself contains the component which performs the telephony functions. The telephony functions may be those employed in switched circuit telephone systems or those employed in packet telephone systems, and the systems themselves may be either wired or wireless.

31 Claims, 20 Drawing Sheets

| I/O COMMAND | I/O ADDRESS | I/O DATA | COMBINATION LOCK STATE AFTER I/O COMMAND | DESCRIPTION |
|---|---|---|---|---|
| READ | IGNORED | IGNORED | 7 | (LOCKED STATE) |
| WRITE | X'8201' | 00h | 3 | ACCESS SEQUENCE 1 |
| WRITE | X'8201' | 00h | 1 | ACCESS SEQUENCE 2 |
| WRITE | X'8201' | 80h | 4 | ACCESS SEQUENCE 3 |
| WRITE | X'8201' | 00h | 2 | ACCESS SEQUENCE 4 |
| WRITE | X'8201' | 80h | 5 | ACCESS SEQUENCE 5 |
| WRITE | X'8201' | 80h | 6 | ACCESS SEQUENCE 6 (UN-LOCK STATE) |
| WRITE | X'C201' | | 6 | INITIAL CONFIGURATION REGISTER LOAD TO ENABLE SSC TO RESPOND TO HOST I/O COMMANDS |

| BIT | NAME | DESCRIPTION/FUNCTION |
|---|---|---|
| 0 | IOASEL0 | I/O ADDRESS SELECT 0- ACTIVE HIGH - THE SSC I/O PORT CAN BE MAPPED TO ONE OF EIGHT DIFFERENT RANGES IN THE HOST SYSTEMS I/O ADDRESS SPACE. |
| 1 | IOASEL1 | I/O ADDRESS SELECT 1- ACTIVE HIGH - THE SSC I/O PORT CAN BE MAPPED TO ONE OF EIGHT DIFFERENT RANGES IN THE HOST SYSTEMS I/O ADDRESS SPACE. |
| 2 | IOASEL2 | I/O ADDRESS SELECT 2- ACTIVE HIGH - THE SSC I/O PORT CAN BE MAPPED TO ONE OF EIGHT DIFFERENT RANGES IN THE HOST SYSTEMS I/O ADDRESS SPACE. |
| 3 | SWRST | SOFTWARE RESET - SOFTWARE RESET CAN BE ASSERTED AT ANY TIME BY WRITING A LOGIC "1" TO CR03. SWRST IS ALSO ASSERTED ON A SYSTEM RESET, AND WILL REMAIN ASSERTED UNTIL A LOGIC "0" IS WRITTEN TO CR03 BY A HOST I/O WRITE TARGETING THE CONFIGURATION REGISTER. |
| 4 | STD# | STANDARD-ACTIVE LOW. IF STD = 0, THEN THE APPLIANCE HANDSET IS CONNECTED TO THE SSC HANDSET CONNECTION, THE FAX CONNECTION IS NOT ACTIVE. IF STD = 1, THEN THE APPLIANCE HANDSET AND FAX CONNECTION ARE CONNECTED TO TELEPHONE WALL JACK. |
| 5 | ISEL0 | INTERRUPT SELECT 0, THE SSC SUPPORTS ONE OF EIGHT DIFFERENT INTERRUPT REQUEST LEVELS TO THE HOST SYSTEM, CONTROLLED BY ISEL[2:0]. |
| 6 | ISEL1 | INTERRUPT SELECT 1, THE SSC SUPPORTS ONE OF EIGHT DIFFERENT INTERRUPT REQUEST LEVELS TO THE HOST SYSTEM, CONTROLLED BY ISEL[2:0]. |
| 7 | ISEL2 | INTERRUPT SELECT 2, THE SSC SUPPORTS ONE OF EIGHT DIFFERENT INTERRUPT REQUEST LEVELS TO THE HOST SYSTEM, CONTROLLED BY ISEL[2:0]. |

Fig. 16

| BIT | NAME | DESCRIPTION/FUNCTION |
|---|---|---|
| 0 | KSEL0 | KEY SELECT 0- ACTIVE HIGH - KSEL[3:0] POINT TO ONE OF SIXTEEN POSSIBLE INTERACTIVE KEYS IN THE KEY ARRAY ON THE SYBIL APPLIANCE. ONLY TWELVE KEYS ARE USED IN THIS MODEL. |
| 1 | KSEL1 | KEY SELECT 1- ACTIVE HIGH - KSEL[3:0] POINT TO ONE OF SIXTEEN POSSIBLE INTERACTIVE KEYS IN THE KEY ARRAY ON THE SYBIL APPLIANCE. ONLY TWELVE KEYS ARE USED IN THIS MODEL. |
| 2 | KSEL2 | KEY SELECT 2- ACTIVE HIGH - KSEL[3:0] POINT TO ONE OF SIXTEEN POSSIBLE INTERACTIVE KEYS IN THE KEY ARRAY ON THE SYBIL APPLIANCE. ONLY TWELVE KEYS ARE USED IN THIS MODEL. |
| 3 | KSEL3 | KEY SELECT 3- ACTIVE HIGH - KSEL[3:0] POINT TO ONE OF SIXTEEN POSSIBLE INTERACTIVE KEYS IN THE KEY ARRAY ON THE SYBIL APPLIANCE. ONLY TWELVE KEYS ARE USED IN THIS MODEL. |
| 4 | SPARE | |
| 5 | SPARE | |
| 6 | LE-IRQ-EN | LEADING EDGE INTERRUPT REQUEST ENABLE - ACTIVE HIGH - ENABLES THE SSC TO INTERRUPT THE HOST ON THE LEADING EDGE (KEY SWITCH MAKE) OF AN APPLIANCE KEY STRIKE DETECT.<br><br>PR6=LE-IRQ-EN<br>PR7 = TE-IRQ-EN<br>CASE LE-IRQ-EN, TE-IRQ-EN<br>    CASE 00: INTERRUPTS TO HOST ARE DISABLED<br>    CASE 01: HOST INTERRUPTED ON KEY SWITCH BREAK<br>    CASE 10: HOST INTERRUPTED ON KEY SWITCH MAKE<br>    CASE 11: HOST INTERRUPTED ON BOTH KEY SWITCH MAKE AND BREAK |

Fig. 17A

| BIT | NAME | DESCRIPTION/FUNCTION |
|---|---|---|
| 0 | PKS0 | PENDING KEY STRIKE BIT-0- ACTIVE HIGH - PKS[3:0] POINT TO ONE OF SIXTEEN POSSIBLE INTERACTIVE KEYS THAT ARE CURRENTLY INTERRUPTING THE HOST. ONLY TWELVE KEYS ARE USED IN THIS MODEL. |
| 1 | PKS1 | PENDING KEY STRIKE BIT-1- ACTIVE HIGH - PKS[3:0] POINT TO ONE OF SIXTEEN POSSIBLE INTERACTIVE KEYS THAT ARE CURRENTLY INTERRUPTING THE HOST. ONLY TWELVE KEYS ARE USED IN THIS MODEL. |
| 2 | PKS2 | PENDING KEY STRIKE BIT-2- ACTIVE HIGH - PKS[3:0] POINT TO ONE OF SIXTEEN POSSIBLE INTERACTIVE KEYS THAT ARE CURRENTLY INTERRUPTING THE HOST. ONLY TWELVE KEYS ARE USED IN THIS MODEL. |
| 3 | PKS3 | PENDING KEY STRIKE BIT-3- ACTIVE HIGH - PKS[3:0] POINT TO ONE OF SIXTEEN POSSIBLE INTERACTIVE KEYS THAT ARE CURRENTLY INTERRUPTING THE HOST. ONLY TWELVE KEYS ARE USED IN THIS MODEL. |
| 4 | SPARE | SPARE |
| 5 | SPARE | SPARE |
| 6 | TE-IRQ | TRAILING EDGE INTERRUPT REQUEST- ACTIVE HIGH - CAN BE MONITORED BY THE HOST DURING IN THE KEY STRIKE INTERRUPT SERVICE ROUTINE. WHEN TE-IRQ IS ACTIVE IT INDICATES THAT A TRAILING (KEY BREAK) INTERRUPT IS BEING SERVICED BY THE HOST. |
| 7 | AP-BUSY | APPLIANCE BUSY - ACTIVE HIGH - THE APPLIANCE BUSY FLAG IS MONITORED BY THE HOST DURING HOST/APPLIANCE DATE TRANSFERS TO THE KEY LCD'S. |

Fig. 18

TELEPHONE STATION EQUIPMENT EMPLOYING REWRITEABLE DISPLAY KEYS

CROSS REFERENCES TO RELATED APPLICATIONS

The present patent application is a continuation-in-part of U.S. Ser. No. 08/615,591, Gerald Gulley et al, filed Mar. 12, 1996 and having the same title and assignee as the present patent application now U.S. Pat. No. 5,790,652. The present patent application contains the entire Detailed Description and Drawing of the parent application. The new material begins with the section Other Embodiments and Applications of the Phone Device.

BACKGROUND OF THE INVENTION

1. Field of the Invention

This invention relates to telephone communications and more particularly to terminal equipment operated by a user to obtain a variety of telephone services.

2. Description of the Prior Art

In recent years, computer-based telephone management systems have been developed in which the computer itself provides the human interface to the telephone system. Such systems typically offer a host of services which replace or supplant the services provided by conventional, standalone telephone terminal equipment such as telephone station sets and facsimile machines. By adding suitable software and interface hardware, such as a data/voice/fax modem, an existing personal computer can be readily converted into a powerful communications tool for establishing conventional voice lines and for sending and receiving facsimile images and data files. Frequently, when the personal computer is coupled to a local area network, shared communications facilities can be made available via the network, eliminating the need for additional telephone interface hardware at each personal computer.

While robust telephone management and communications functions can be provided using the personal computer as the telephone terminal, users have found these systems to be difficult to use. Thus, while a given personal computer telephone management system might include a stored database of telephone numbers which can be activated and then manipulated using the computer keyboard or the mouse to select and automatically dial a desired telephone number, it is often faster and easier to simply look the number up in a published directory and then manually dial the number in the usual way. As software developers add an ever expanding set of features to such computer telephone management systems, such systems necessarily become more complex and more difficult to use, particularly for functions with are infrequently invoked. It is thus an object of the invention to provide an easy-to-use user interface to the complex features of modern telephone systems and thereby to make these features truly accessible to the average user.

SUMMARY OF THE INVENTION

The object of the invention is achieved by using a modification of the standard 12-button telephone key pad to interact with a component of the telephone system. The modification has legends for the keys which can be changed dynamically. The user interacts with the telephone system in the accustomed way, by pushing buttons on the key pad, but when the user pushes a button, the component responds by changing the legends on the buttons as required for the next stage of the interaction. The component of the telephone system also responds to button pushes by executing any telephony functions necessary for the interaction. If the component is a device such as a PC or server that can perform functions other than telephony functions, the relegendable key pad may be used as an interface to these functions as well.

In a particularly useful version of the invention, the key pad is part of a desk-top telephone that is connected to an expansion board in a PC which is in turn connected to the telephone system. The telephone also has a standard POTS (plain old telephone service) connection to the telephone system, and when the PC fails, the telephone reverts to POTS service via the POTS connection. Failure of the PC is detected by the expansion board, which then disables the link between the relegendable keypad and the PC. One version of the telephone includes a separate keypad for use when the PC has failed and the POTS connection is being used. The expansion board further contains an access control mechanism which ensures that there are no unintended reactions between the expansion board and other components of the PC.

The invention may be implemented in many different ways. At one extreme, the invention may be implemented completely in a PC or other desk-top work station that is connected to a wired or wireless telephone system. In such a version, the keypad is displayed on the PC's display and the user employs a pointing device to manipulate it. At the other extreme, the invention may be implemented in a stand-alone device which may be directly connected to a wired or wireless telephone or packet telephony network. Midway between these implementations are ones where the invention is implemented by means of an expansion card in the PC and a desk-top device connected to the expansion card.

There are also many possible configurations of systems incorporating the invention, ranging from systems in which a single desk-top telephone incorporating the invention is coupled by cable to an expansion card in a PC through systems in which a number of desk-top telephones are connected by a LAN to a server which is in turn connected to the telephone system to systems in which the desk-top telephones are connected to a private branch exchange to system in which the desk top telephones are directly connected to the telephone network. The connections between the telephone and the PC, server, private branch exchange, and the telephone network may be wired or wireless. Telephone devices employing the invention are particularly adapted to packet telephony, in which both voice and control information are transmitted as packets of digital data.

These and other aspects and objects of the invention will become apparent to those skilled in the arts to which the invention pertains upon perusal of the following Detailed Description and drawing, wherein:

BRIEF DESCRIPTION OF THE DRAWING

FIG. 15 is a diagram of the state machine used to unlock the expansion board in a preferred embodiment;

FIG. 16 is a diagram of the configuration register in the expansion board;

FIG. 18 is a diagram of the key state latch in the expansion board;

Figure 1:
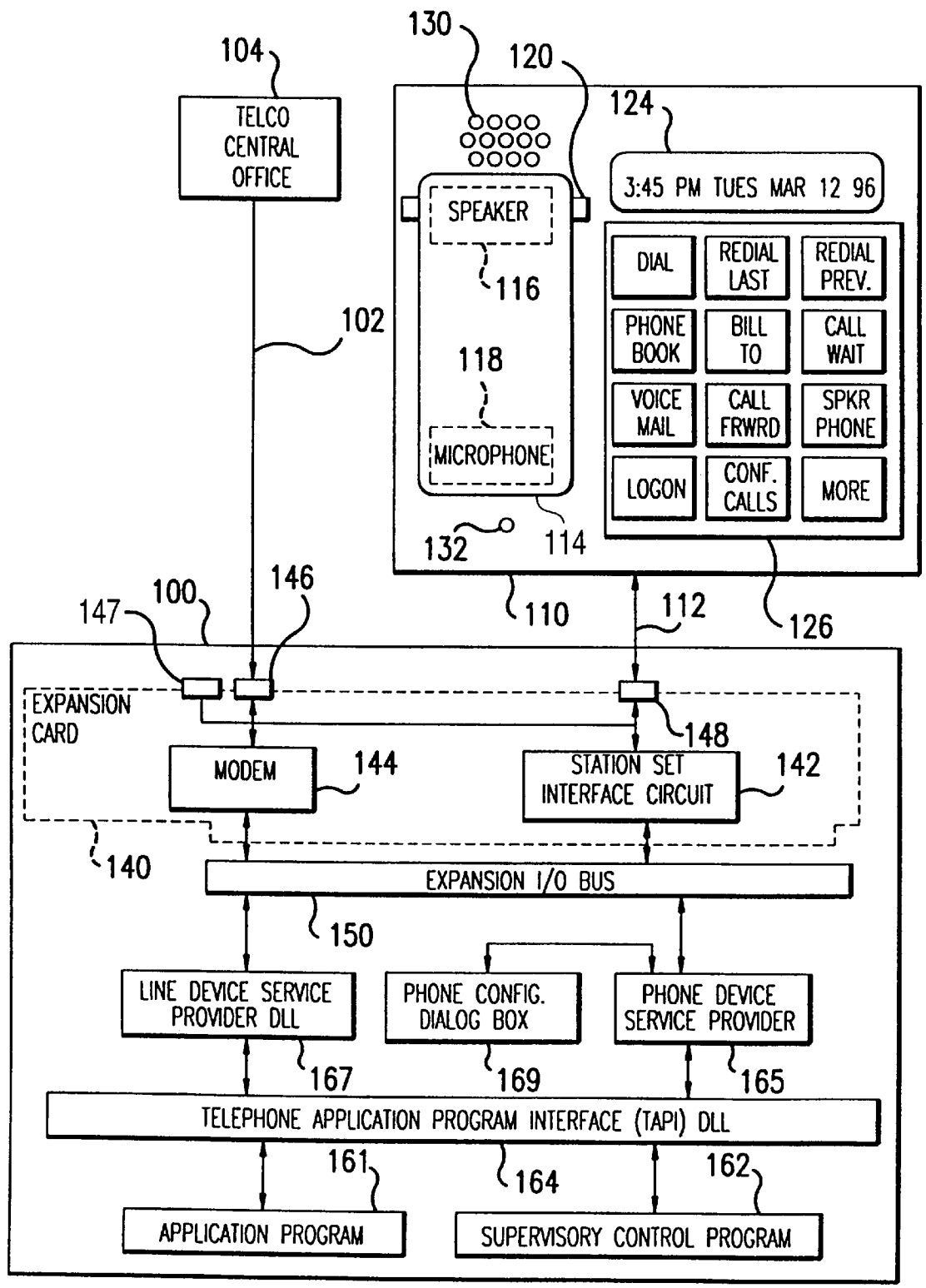
FIG. 1 is a block diagram illustrating the relationship between the principle components of the preferred embodiment of the invention.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

Introduction

The following Detailed Description begins with a description from the parent of the present patent application of the software environment in which the invention operates, of the functions performed by the invention, and of an embodiment of the invention. To this has been added a description of the presently-preferred embodiment of the expansion card and phone device, a generic description of the invention, and descriptions of a number of species of the invention.

Overview of a System incorporating the Invention: FIG. 1

FIG. 1 illustrates the relationship between the principal hardware and software components of the preferred embodiment of the invention. As seen in FIG. 1, a personal computer 100 is connected via telephone subscriber line 102 to a telephone service central office 104. Computer 100 is further connected to a phone device 110 by an interface connection 112.

The phone device 110 includes a handset 114 which houses an earpiece speaker 116 and a mouthpiece microphone 118. When not in use, the handset 114 rests on the housing of the phone device 110, engaging a hookswitch illustrated at 120 to place the phone device in an "ON HOOK" state in the conventional fashion. A liquid crystal display panel 124 and a keypad 126 are mounted on the exterior face of the phone device 110. The display 124 is capable of displaying up to twenty-four alphanumeric characters which are transferred as a character data stream to the phone device 110 via the interface connection 112.

The keypad 126 preferably comprises twelve display keys arranged in the conventional telephone keypad matrix consisting four rows with three keys per row. A key actuation signal is sent to the personal computer 100 via the interface connection 112 whenever any of the keys in the keypad 126 is pressed or released. Each key in the keypad 126 incorporates a backlit liquid crystal display (LCD) panel which is capable of displaying a graphical or alphanumeric image, the image being transferred to the key via the connection 112 as a block of pixel image data generated and transmitted by the computer 100. In addition, the backlighting of each key's LCD display panel is selectively controlled by backlight command signals supplied to the phone device 110 via connection 112 such that the backlighting may be turned OFF, or turned ON in a selected color (e.g. white, green or red).

The phone device 110 is further provided with a distinctive ringing device (not shown in FIG. 1), a loudspeaker indicated at 130, and a pickup microphone seen at 132. The loudspeaker 130 and microphone 132 permit the phone device 110 to operate as a speakerphone. Control commands sent from the computer 100 via connection 112 are employed to independently control the volume of sound delivered by the loudspeaker 130 and the volume of the sound produced by the earpiece speaker 116 in handset 114. Similarly, control commands sent via connection 112 independently control the gain of the pickup microphone 132 and the mouthpiece microphone 118.

Circuitry on a hardware expansion card 140 is used to establish communications between the computer 100 and the telephone line 102 and between the computer and the phone device 110 via the interface connection 112. The expansion card 140 plugs into a standard I/O system bus hardware interface slot seen at 150 to establish connections with the data, address and control lines of the personal computer 100. As discussed in more detail below, the embodiment of the invention described herein is adapted for use with personal computers typically employing the Intel 386, 486 and Pentium processor families capable of implementing the Windows 95 and Windows NT operating system distributed by Microsoft Corp. Accordingly, the expansion card 140 is preferably adapted to mate with and communicate with a system bus slot configured in accordance with the ISA or EISA (16 bit) or the PCI bus (32 bit) interface standard commonly used in computers of this class. Specifications and complete descriptions for each of these industry standard bus configurations may be found, for example, in Chapter 5, "Bus Slots and I/O Cards", *Upgrading and Repairing PCs*, 5th Edition, by Scott Meuller, Que Corp., Indianapolis, Ind. (1995), ISBN 0-7897-0321-1.

The expansion card 140 preferably includes a data/fax/voice modem unit 144 of conventional design. The modem unit 144 preferably provides modem data transmission at 28.8K bps employing the CCITT modem protocols V.34; V.Fast Class; V.32 terbo; V.42 bis; V.42; V.32 bis; V.32; V.22 bis; and V.22, supports the MNP 5 error correction/data compression protocols, and the Hayes AT command set for line control, including autodial support. The modem 144 additionally provides send/receive FAX modem document transmission at 14.4K bps using the CCITT Group 3 Fax protocol (V.17). Available internal expansion cards which provide such industry standard data/fax/voice capabilities over dialup telephone facilities are available commercially as exemplified by the Courier V Everything with V.34 PC modem sold by U.S. Robotics Corp., 8100 N. McCormick Blvd., Skokie, Ill. 60076-2999 and the Optima 2881 V.34/ V.FC+FAX modem sold by Hayes Microcomputer Products, Inc., PO Box 105203, Atlanta, Ga. 30348, both of which are compatible with the 16 bit ISA I/O bus. The conventional data/voice/fax modem 144 typically includes a telephone line control mechanism for performing pulse and dial tone (DTMF) dialing, data compression and error correction, data transmission flow control and protocol support, transmission speed control, and transmission control.

As seen in FIG. 1, the modem unit is connected to the dialup telephone line 102 by a standard telephone jack 146 which is cross-connected with an auxiliary telephone jack 147 which permits other telephone station equipment to be connected to the telephone line 102. The interface connection 112 to the phone device 110 is connected to the expansion card 140 by means of a standard 25-line PC parallel port connection 148 which includes power, bidirectional data lines, control lines, and lines directly connected to the telephone lines 102. See Chapter 11, "Communications and Networking," *Upgrading and Repairing PCs*, cited above, for pin assignment specifications for the standard parallel port interface. The display keys in the keypad 126 receive display data via 8 bit parallel data output lines of the connection 112, and the 8 data input lines of the connection are used to pass key press signals from the phone device and to provide circuit paths for the telephone line circuit 102 (tip and ring lines) which are directly cross connected between the phone jack connectors 146 and 147 and the telephone circuit lines of the interface connection 112 at the 25 pin socket 148. This direct cross-connection allows to phone device to operate as a conventional telephone when the computer 100 is powered down. To this end, the phone device may advantageously be provided with a conventional auxiliary touch-tone keypad (not shown) in the handset 114 and an associated dial tone generation circuitry, permitting outgoing calls to be dialed manually at the handset, even when the computer 100 is inoperative. Alternatively, the display key switches in keypad 126 may be interconnected with a dial tone generator for generating dial tones when the computer 100 is powered down and unable to produced dialing signals using the modem 144. Similarly, the phone device 110 includes a ringing circuit (not shown) for providing audible ringing in response to the appearance of ringing signals on the telephone line circuit 102 when the computer 100 is inoperative and, as discussed later, for providing ringing signals at the phone device in response to ringing commands from the computer 100.

Software

The personal computer 100 includes a conventional mass storage subsystem (not shown), typically a magnetic "hard" drive, which provides persistent storage for program files which are loaded into the computer's random access memory for execution by the processor. These program files are loaded by the operating system to form concurrently resident, interactive modules illustrated in block diagram form in FIG. 1. These modules include:

a supervisory control program seen at 162 which functions as an application program automatically loaded during system startup and thereafter continuously resident as an active, although typically dormant, process as long as the computer 100 is powered up in order to support the operation of the phone device 110;

a telephone application program interface library 164, such as the TAPI dynamic link library (DLL) which forms part of the Windows 95 operating system marketed by Microsoft Corp., Redmond, Wash.;

a phone device service provider dynamic link library 166 which operates as a hardware device driver providing interface routines which provide communications between the phone set hardware interface circuit 142 and the TAPI DLL 164;

a line device service provider dynamic link library 167 such as the UniModem SPI included as part of Windows 95 which provides a device driver interface between the data/voice/fax modem 144 and the line device service provider interface (Line Device SPI) 168 defined by the TAPI DLL 164;

a configuration dialog box routine 169 which may be invoked by the phone device SPI DLL 165 when the supervisory control program or any other running application program such as application program 170 requests the user to provide configuration information by making passing a request for the configuration dialog box via the TAPI DLL 164 and the phone device service provider 165; and one or more additional application programs illustrated by the program 170 which offers telephone management services utilizing the services provided by the TAPI DLL.

The supervisory control program 162 preferably communicates with the modem 144 and with the phone device interface circuit 140 using a standard interface protocol such as the Telephony Application Program Interface (TAPI) jointly developed by Microsoft Corp. and Intel Corp. Alternatively, the Telephony Services Application Program Interface (TSAPI) promulgated by Novell, Inc. and others may be similarly employed to provide substantially the same functionality. The embodiment of the invention, as described in more detail below, employs the TAPI interface implemented in Microsoft's Windows 95 operating environment and described in detail in the *Microsoft WIN32 System Development Kit* (SDK), "Telephony Application Programming Interface (TAPI)", published as part of the Microsoft Development Library by Microsoft Corp., Redmond, Wash.

The supervisory control program 162 takes the form of a WIN32 application program which functions in accordance with the software design specifications set forth in the *Microsoft Win32 Programmer's Reference* (1995), published by Microsoft Corp., which fully describes the elements of the Win32 application programming interface (API), including functions and related data types, macros, structures, and messages. The *Win32 Programmer's Reference* is the definitive source for specific information defining the makeup of Win32-based applications.

As described in more detail below in connection with FIG. 2, supervisory control program 162 controls the operation of the modem 144 and the phone device 110 by responding to Windows messages relating to telephone management operations, by making function calls to the TAPI.DLL 164 which forms part of the Windows 95 operating system, and by incorporating callback functions which respond to function calls from the TAPI.DLL 164. The *Win32 Telephony (TAPI) Programmer's Reference* (1995), published by Microsoft. Corp., defines the Microsoft Windows Telephony application programming interface (API) which provides services that enable an application developer to add telephone communications to applications developed for the Microsoft Win32 (API). Additional information, including example programs illustrating the mechanism used by application programs to implement telephone functions using TAPI are described in the article "Tapping into TAPI", by Nancy Winnick Cluts, *Microsoft Developer Network News*, Vol 4. No. 6 (November–December 1995);

"Creating a TAPI Connection Using CtapiConnection," by Nancy Winnick Cluts, *Microsoft Developer Network News*, Vol 5. No. 1 (January 1996); and "Developing Applications Using the Windows Telephony API," by Toby Nixon, *MSDN Conferences/Tech*Ed* 1994/*Microsoft At Work* (1994).

The supervisory control program 162 is preferably loaded at system startup time when the Windows 95 operating system is initialized. As is in all Windows 95 application programs, the supervisory control program 162 and includes, in its main routine, message loop which repetitively calls the WIN32 function GetMessage. The control program 162 operates in background and its sole purpose is to execute code in response to window messages posted to the program thread's message queue. If there are no pending messages, the operating system puts the thread to sleep and no longer schedules CPU time to the thread. When a message appears in the thread's message queue, the system wakes up the thread, GetMessage copies the message from the queue into the &msg variable and Windows then executes the function DispatchMessage to pass the message data to the window procedure of the control program 162.

The mechanism used by TAPI to notify applications of events is based on function callbacks, and TAPI defines the parameter profile for these callbacks. When an event occurs, the application's callback function is invoked from within the application's thread (at the time the application calls the GetMessage function), providing a normal, fully functional execution environment in which all Windows APIs can be safely invoked. To perform operations which must be handled asynchronously, TAPI provides a reply callback mechanism. The reply callback made to the application carries the request ID and an error indication. Valid error indications for this reply are identical to those that are returned synchronously for the associated request, or zero for success. Only the application that issued the request will receive the reply callback, but when the request causes changes in the state of the device or call, other interested applications may also receive event-related messages. TAPI guarantees that a reply callback is made for every request that operates asynchronously, and it defines which functions are notified synchronously and which are notified asynchronously.

Messages transmitted to the application from TAPI utilize the application-supplied callback function, lineCallbackFunc, in the application's context. When an application makes the TAPI function call lineinitialize or phoneInitialize, it specifies a callback function by passing its pointer as a parameter. The callback message always contains a handle to the relevant object (phone, line, or call). The parameter profile for callbacks contains a multipurpose handle parameter which is used for passing a handle to the relevant phone, line, or call. The callback function can determine the type of the handle from the message that was passed to the callback. Certain messages are used to notify the application about a change in an object's status. These messages provide the object handle and give an indication of which status item has changed. The application can call the appropriate "get status" function of the object to obtain the object's full status.

Messages from TAPI which represent line device events (events characterizing the status and functioning of the modem 144 and the telephone line 102) are produced by the UniModem line device service provider 167. Similarly, phone device events characterizing the status and functioning of the phone device 110 are produced by the phone device service provider 140. Both of these service providers operate as device drivers which support the TAPI SPI for communication of hardware events and signals to the TAPI DLL via the TAPI line device SPI and the TAPI phone device SPI. Detailed information on the structure and operation of Windows 95 device drivers generally is contained in The *Device Driver Programmer's Reference*, Microsoft Corp. (1995) which details the structure and operation of Windows-based device drivers for use with Microsoft Windows 95. Microsoft *Windows* 95 *Device Driver Development Kit*, Microsoft Corp. (1995), provides additional detail and examples used to implement device drivers generally, and specific information on the makeup of line device driver routines suitable for interfacing a robust voice/data/fax modem with the TAPI SPI may be found in the *Windows* 95 *Modem Development Kit* (*MDK*), Microsoft Corp. (1995), which provides the tools, sample INF files, and information needed to build and test the Windows 95 format INF files for AT (data) and AT+V (voice) command modems. Windows 95 INF files are required for modems to be used by programs which call the Windows Telephony API (TAPI) to make data/fax/voice calls, including the Windows 95 applets HyperTerminal, Dial-up Networking, Phone Dialer, and other Win32 communications applications written for Windows 95.

The preferred embodiment of the invention seen in FIG. 1, as noted above, may employ a commercially available data/voice/fax modem 140 as well as a conventional line device service provider DLL 167. It should be understood however that the TAPI line services may be provided by other conventional means, such as a high speed ISDN connection, a network interface to a shared modem or PBX, and the like, in ways that are essentially transparent to the operation of the phone device 110 and the supervisory control program 162. The line device service provider 167 may accordingly take the form the universal modem driver (UniModem) supplied as part of Windows 95, an operating system layer that cooperates with TAPI to provide services for data and fax modems and voice so that users and application developers need not deal with difficult modem AT commands to dial, answer, and configure modems. Rather, UniModem does these tasks automatically by using mini-drivers written by modem hardware vendors and made available, for most modems, as a part of Windows 95 or supplied separately by the modem vendor. UniNodem is both a VCOMM device driver (supporting DOS legacy programs) and a TAPI service provider. Other service providers (for example, those supporting other devices, such as an ISDN adapter, a telephone on a PBX system, or an AT-command modem) can also be used with TAPI and thereby made available for use by the phone device 110.

The phone device service provider 165 similarly operates as a WIN32 device driver but performs a more limited set of functions in support of the TAPI phone device interface built in functions and protocols for handling all of the following elements:

Hookswitch/Transducer. The Windows 95 Telephony API recognizes that a phone device may have several transducers, which can be activated and deactivated (taken offhook or placed onhook) under the control of an application (e.g. the supervisory control program 162) or manual user control. TAPI handles the two types of hookswitch devices present in the phone device 110: the handset 114, a traditional mouth-and-ear piece combination that must be manually lifted from the hookswitch 120 and held against the user's ear, and the speakerphone formed by the combination of loudspeaker 130 and pickup microphone 132, enabling the user to conduct calls hands-free. The hookswitch state of the phone device 110's speakerphone can be changed both manually and by the supervisory control program 162 in response to the depressing of display keys in the phoneset.

Volume Control/Gain Control/Mute. Each hookswitch device is the pairing of a speaker and a microphone component. The TAPI API provides for volume control and muting of speaker components and for gain control or muting of microphone components.

Ringer. A means for alerting users, usually through a bell. The phone device 110 preferably includes a ringing annunciator which rings in a variety of modes or patterns to provide distinctive ringing determined by commands from the control program 162 and transmitted via TAPI to the ringing circuitry in the phone device 110.

Display. The LCD display panel 124 seen in FIG.1 for visually presenting messages to the user is supported by the TAPI display functions. A TAPI compliant phone display is characterized by its number of rows and columns. In the illustrative embodiment described here, the display consists of a single LCD panel 124 for displaying a single, 24 character alphanumeric string passed via the TAPI display interface from the control program 162.

Buttons and lamps. The TAPI button interface is used to support the array of twelve backlit display keys in the keypad 126. Whenever the user presses a button on the keypad 126, TAPI reports that the corresponding button was pressed to the application program (e.g. the supervisory control program 162). TAPI button-lamp IDs identify a button and lamp pair. The white backlighting source in each button is treated as the lamp associated with the associated physical keypad button which to form one such TAPI "pair." TAPI also accommodates button-lamp pairs with either no button or no lamp, and hence two sets of twelve "buttonless" pairs are used to handle the green and red backlighting sources for the display keys. The backlighting lamps are hence individually controllable from the API and can be lit in different modes by independently varying the on and off frequency of each of the three backlight lamp colors (white, red and green) to provide Off, flashing, flickering or flash-flickering modes for each. This mode and color control enables special visual effects to be employed to direct the user's attention to special features and functions. Each lamp, color and mode can be independently set using the TAPI button-lamp ID to identify the lamp being controlled.

Data Areas. TAPI further accommodates the loading of addressable memory areas in the phone device. Normally used in TAPI environments for storing phone device instruction code or data that can be downloaded to and/or uploaded from the phone device, the present invention also utilizes this TAPI data movement mechanism to transmit the individual display key bitmaps from the control program 162 to the display keys in keypad 126 as described in more detail below.

In addition to the utilization of TAPI as noted above for the communication of control commands from the application program (e.g. control program 162) to the phone device 110, TAPI is also used to transmit information concerning the actuation of keys on the keypad to the application program. When a button is pressed, a PHONE_BUTTON message is sent to the application's callback function. The parameters of this message are a handle to the phone device and the button-lamp ID of the button that was pressed. The keypad buttons (normally labeled '0' through '9', '*', and '#') are assigned the fixed button+white lamp IDs 0 through 11. These button messages indicate when a button is pressed and when it is released, enabling the supervisory control program to maintain a software status indication for each button, permitting the control program to recognize and respond to two or more buttons to be pressed simultaneously to create special effects, in the same way that simultaneous key presses on a computer keyboard may be assigned special significance.

Figure 2:
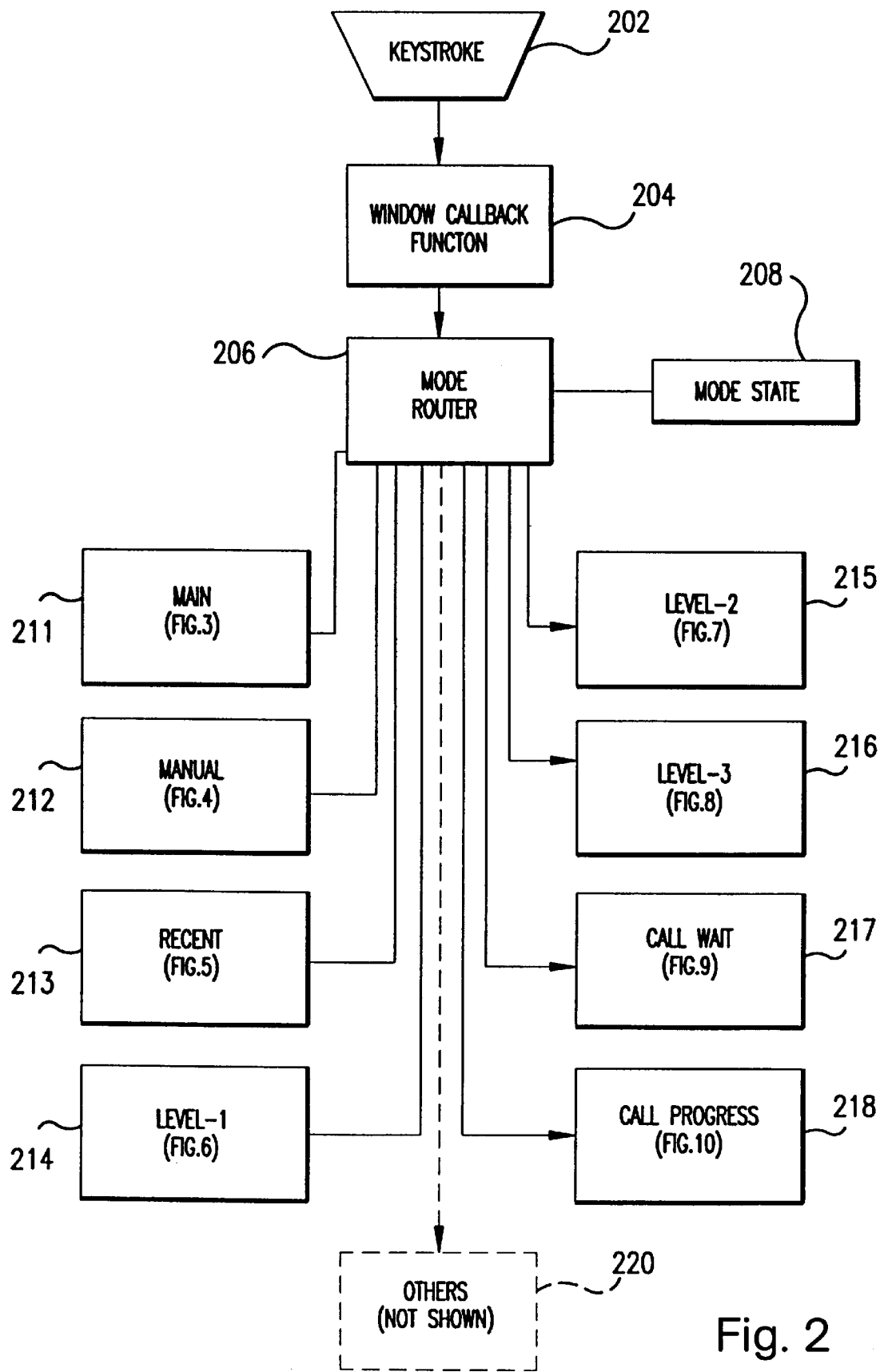
FIG. 2 is a control flow diagram illustrating the manner in which key press operations are processed by the supervisory control program used to implement the invention.

The supervisory control program 162 responds to each key press operation as illustrated in FIG. 2. Each keystroke operation performed by the user using the keypad 126, indicated at 202 in FIG. 2, sends a PHONE$_{13}$ BUTTON message to the callback function 204 of program 162. The callback function 204 evaluates the incoming message, setting that switch status variable associated with the button ID identified in the incoming message to a value determined by whether the message indicates that the button has been pressed or released. Messages indicating that a button have been pressed are then passed to message routing function 206 which calls a particular message handling function in accordance with the current value of the modestate variable stored at 208.

The modestate variable 208 contains one of a predetermined set of ordinal values each of which indicates a particular machine state. A message handling function is associated with each state. FIG. 2 shows eight such functions, by way of illustration, at 211–218. Each mode function 211–218 interprets and responds to the keypress signals from keypad 126 when the machine state is in a particular mode. Thus, when the modestate variable is in MAIN mode, each incoming PUSH-BUTTON message is routed to the MAIN message handling function 211; when the modestate is MANUAL, the routing function passes the PHONE_BUTTON message as a parameter to the MANUAL message handling function 212, and so on.

Figure 3:
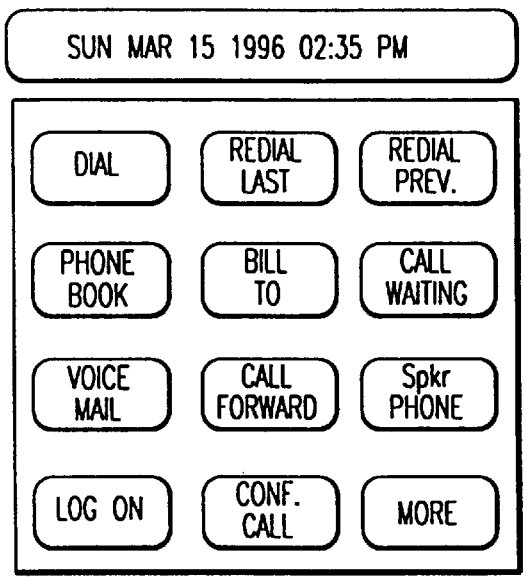
FIGS. 3–10 illustrate eight keypad displays utilized in connection with eight corresponding mode states of the phone device.
Figure 4:
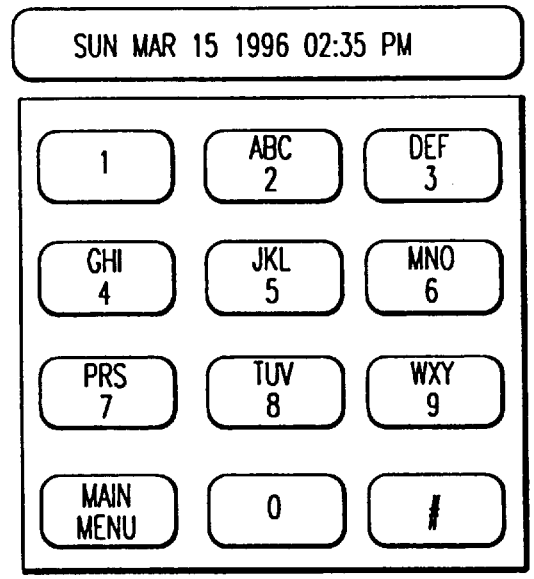
Figure 5:
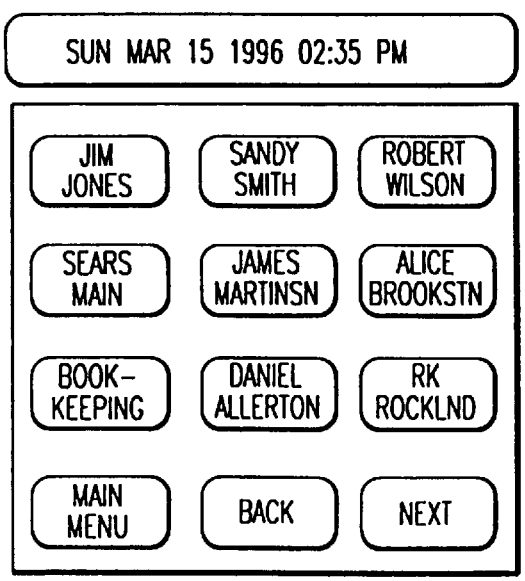
Figure 6:
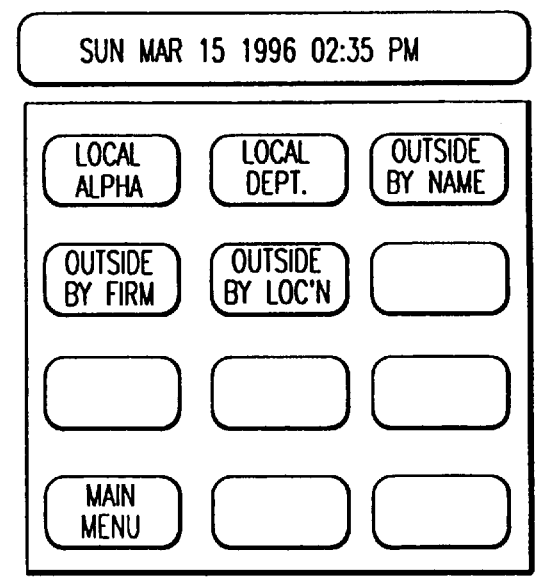
Figure 7:
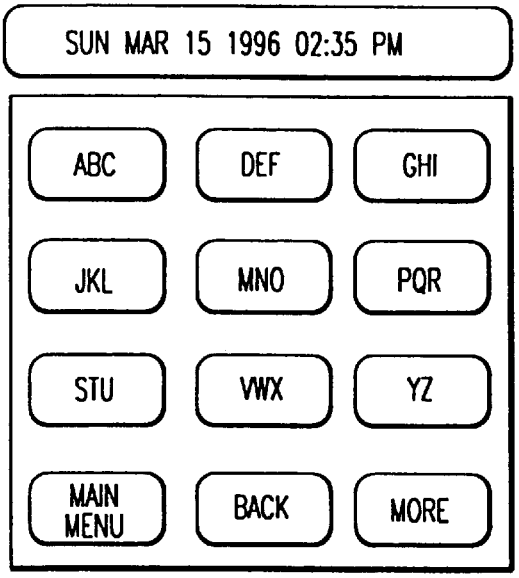
Figure 8:
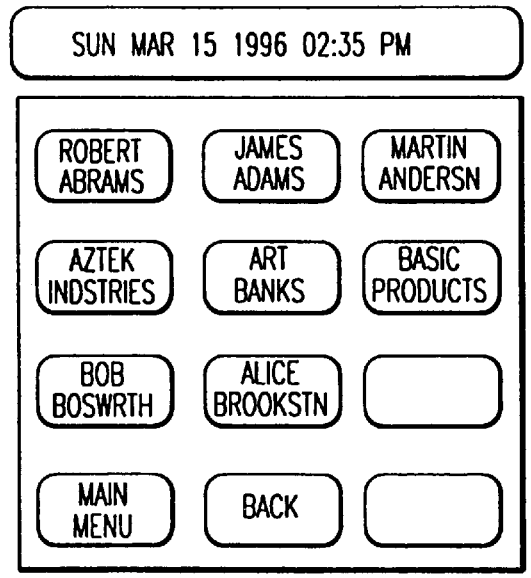
Figure 9:
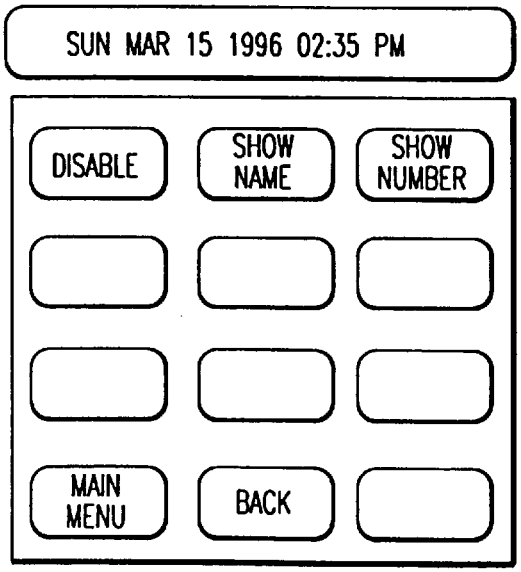
Figure 10:
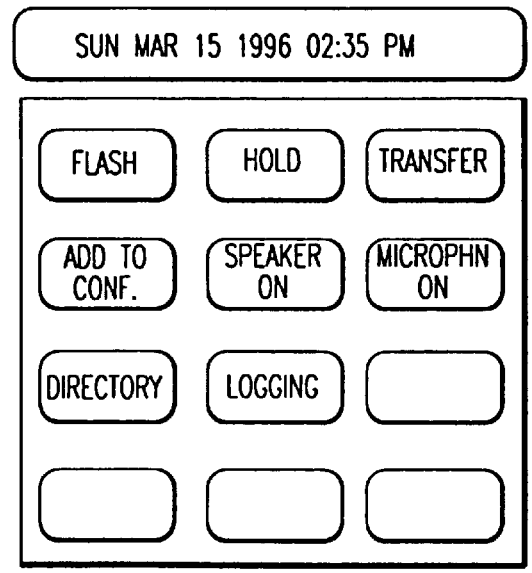

In many cases, a message handling function will respond to a particular button press by switching mode states. Mode state changes are accomplished by (1) setting the modestate variable 208 to a new value, thereby changing the routing of incoming messages; (2) sending a new set of button graphics displays and backlight lamp settings to the keypad 126; and (3) sending a new alphanumeric string for display by the LCD panel 124. Illustrative button and LCD displays are shown in FIGS. 3–10 of the drawings which show the button graphics and alphanumeric displays used for each of the eight illustrative modestates and their corresponding message handling functions as set forth in the table below:

| Button Display | ModeState Description | Message Handler |
| --- | --- | --- |
| FIG. 3 | Main (idle state) | 211 |
| FIG. 4 | Manual Dialing | 212 |
| FIG. 5 | Recently Called Parties | 213 |
| FIG. 6 | Directory Level 1 | 214 |
| FIG. 7 | Directory Level 2 | 215 |
| FIG. 8 | Directory Level 3 | 216 |
| FIG. 9 | Call Waiting Setup | 217 |
| FIG. 10 | Call in Progress | 218 |

When the supervisory program is initialized it places the phone device in the MAIN ModeState. Moreover, if the system is idle, as indicated by a predetermined elapsed time with no key press activity, the supervisory program 162 automatically returns the phone device to the MAIN (idle) ModeState.

Each time the supervisory program places the phone device into any new ModeState, it performs at least the following actions:

(1) the ModeState variable is set to a new value indicating the new mode state such that, thereafter, all PHONE_BUTTON messages will be routed to the appropriate modestate message handling routine 211–220.

(2) a new alphanumeric string is transmitted to the display 124 seen in FIG. 1. TAPI provides access to a phone's display which is rewritten using the function call phoneSetDisplay to write information to the display 124 of the open phone device 110.

(3) a new set of twelve bitmaps is sent to the twelve key displays in the keypad 124. The Telephony API models a phone device as having one or more download or upload areas. Each area is identified by a number that ranges from zero to the number of data areas available on the phone minus one. Sizes of each area may vary and he format of the data itself is device-specific. In the illustrative embodiment, twelve download areas are reserved for monochromatic bit maps, with each bit indicating whether a given pixel is ON or OFF. Key display resolutions of 32×16 (512) bits provide sufficient resolution to provide meaningful function identifications, however more descriptive information, such as the names of parties to be called which are displayed in a speed dialing directory as discussed later, can be provided using a larger bitmap. In the examples that follow, a 64×64 bit display is assumed, requiring that a 4096 bit (512 byte) TAPI download area be designated. The TAPI phoneSetData function downloads a buffer of data to a given data area in the phone device. The twelve bitmaps for each modestate are stored in two dimensional array indexed by the modestate value and the button number 0–11. When a new modestate is entered, the supervisory control program calls phoneSetData twelve times to pass the bitmaps for the twelve keys associated with the new modestate to the keypad 126.

(4) The backlighting of each key is also reset whenever a new modestate is entered using the TAPI phoneSetLamp, which lights a lamp on a specified open phone device in a given lamp lighting mode. TAPI supports the following lamp mode specifications:

PHONELAMPMODE_OFF—the lamp is off.;
PHONELAMPMODE_STEADY—the lamp is continuously lit.;
PHONELAMPMODE_FLASH—"Flash" means slow on and off;
PHONELAMPMODE_FLUTTER—"Flutter" means fast on and off;
PHONELAMPMODE_BROKENFLUTTER—"Broken flutter" is the superposition of flash and flutter; and
PHONELAMPMODE_WINK—the lamp is winking.

FIG. 3 shows the bitmap displays presented in an illustrative MAIN (idle) mode. In FIGS. 3–10, the alphanumeric display presented by the LCD display 124 is shown immediately above the 12 key bitmap displays. In the MAIN modestate, the LCD display shows the current date and current time of day which is updated every minute by a timer routine in the supervisory control program which obtains the date and time from the system, constructs and formats the display string, and sends the resulting string to the display using the TAPI function call phoneSetDisplay.

In the MAIN modestate, the twelve buttons on the keypad display the bitmaps illustrated in FIG. 3 and all PHONE_BUTTON messages received from TAPI are routed to the MAIN routine seen at 211, which operates as follows when the respective button numbers 0 through 11 are identified:

Button 0 pressed: Manual dialing is requested the system is placed in the MANUAL modestate, resulting in the display seen in FIG. 4 being displayed and all PHONE_BUTTON messages thereafter being processed by the MANUAL message handler 212;

Button 1 pressed: The user requests that the most recently dialed number be redialed. Each dialed number is saved by the supervisory control program is saved in a dialable phone address string variable LAST_DIALED which is passed to TAPI using a lineMakeCall or LineDial function call. The modestate is then switched to the INPROGRESS mode (FIG. 10) and the display 124 is sent a string containing the concatenated combination of "Dialing" and the LAST_DIALED string variable to overwrite the default display message created when the INPROGRESS mode was entered.

Button 2 pressed: The user requests a display of the most recently dialed numbers, which is accomplished by entering the PREVIOUS modestate whose display is illustrated in FIG. 5. As calls are established, they are stored in a most-recently-used stack in a persistently stored database by the supervisory control program 162 with the nine most recent called parties being displayed as shown in FIG. 3. One of the most useful features of the invention is its ability to visually associate the identification of a callable party with a key. As illustrated by FIGS. 3 and five, the task of redialing a selected one of the nine most recently called numbers involves only two keypresses, first pressing the key labeled "Redial Prev." which then displays the nine most recently called parties on keys, and then pressing the key for the desired party, without any need to touch a computer keyboard, start a particular telephone management program, or manipulate window objects with a mouse. No computer skills are required and small children can readily understand and use the system in a completely familiar and intuitive way.

Button 3 pressed: The user requests access to a multi-level phone book which takes the form of a conventional relational database (not shown), persistently stored in the computer 100 and accessed by the control program 162. Pressing Button 2 labeled "Phone Book" sets the modestate to LEVEL_1 to create the display seen in FIG. 6 and route ensuing PHONE_BUTTON messages to the Level-1 message handling routine 214. In the LEVEL_1 mode, the user can select between a variety of subdirectories, illustrated in FIG. 6 as consisting of button selectable sub-directories of (1) local numbers within a business establishment arranged alphabetically, (2) the same local numbers organized by work group, (3) outside phone numbers organized alphabetically by the last name of the callable person, (4) outside number organized alphabetically by firm name, (5) outside phone numbers organized alphabetically by geographical location. When a button is pushed to select a subdirectory organized which is organized alphabetically, the control program 162 first executes a subroutine which consists of sending a keypad display of the type seen in FIG. 7 to the keypad to obtain a selection from the user identifying an alphabetic subsection of the phone book database directory. As an example, if the user wishes to call a person outside the organization named "Alice Brookstone", the "Phone Book" key would be pressed first in the MAIN modestate presenting the display of FIG. 6. Then, the user would press the button marked "Outside be Name" to produce the display of FIG. 7. Next, the button marked "ABC" would be pressed to produce an listing of callable parties displayed alphabetically by last name, as illustrated in FIG. 8, which includes a button bearing the display "Alice Brookstn" (shortened to fit into the 64×64 bit display). Pushing that button would place the call to her phone number in the manner indicated earlier and further place her identification in the stack of recently called parties as well as in the LAST_DIALED variable discussed earlier to make her name and number available using the MAIN mode "Redial Last" and "Redial Prev." buttons.

Button 4. By pressing the "Bill To" button in the MAIN modestate, the user can use a database lookup function similar to the phonebook lookup procedure indicated above to identify a particular billing account to which future calls should be billed. When button 4 is pressed in MAIN mode, the phone device is reset to the BILLTO modestate and a lettercode grouping display as shown in FIG. 7 is shown on the keypad, except that the LCD display shows the current account selected with a display such as "Bill To Ajax. Corp." If the user determines that the current setting is correct, the "Main Menu" or "Back" keys can be pressed to return the system to the MAIN modestate. Note that, to provide a consistent interface to the user, three functions always appear in the same positions on the keypad: "MAIN MENU" (for resetting the system to its MAIN modestate), "BACK" (for returning the system to the modestate that called the present state, which may or may not be the MAIN modestate), and "NEXT" for calling a modestate which is, in effect, contains additional options and forms, in effect, an extension of the present state). In the case of lookup functions such as those implementing the "phone book" and "bill to" selections, the "NEXT" key operates to continuously step through a given directory level, nine items at a time, returning to the first items when the end of the directory level is reached. To implement the accounting functions, the supervisory control program appends a record to an accounting file each time a call is completed, recording the identity of the party with whom the communication took place, the starting and ending time of the call (from which its duration may be determined for billing purposes), and the identification of the account (selected using the Bill To key sequence described above) to classify the call. Actual billing reports are then produced at any time by reading the data stored in the accumulated accounting file.

As illustrated by the foregoing examples, the present invention permits substantially any telephone management function to be activated by an inexperience user by simply pressing buttons labeled to indicated the desired functions. As illustrated in the display seen in FIG. 3, these functions may additionally include call waiting setup controls, voice mail, call forwarding control, speakerphone activation and control, database logon functions, and more.

In addition, as illustrated in FIG. 8, the display keypad and LCD may be used to control the handling of a call in progress when the system is in the INPROCESS modestate. Pressing the "Flash" button seen in FIG. 8 causes the CallProgress message handler 218 to terminate the present connection by calling the TAPI function lineDrop to obtain a new dialtone and reset the system to its MAIN modestate to permit a new call to be initiated. Pressing the "Hold" button suspends the present call without loosing the connection and, if additional lines are available through, allows another conversation to proceed concurrently.

Note that the capabilities of the TAPI DLL included with the operating system permit a plurality of different lines to be active simultaneously and allow a give phone device to be programmatically "connected" with an such logical line.

Similarly, the display keypad control mechanism contemplated by the invention may be used to particular advantages to control "Supplementary Services which are defined by the Telephone SPI, but not included in the basic telephony subset. These services include all so-called supplementary features found on modern PBXs including hold, transfer, conference, park, etc. Depending on the capabilities of the line device services which are connected in a given setting, the present invention can control these services through the TAPI DLL, and can query a line or phone device for the set of supplementary services it provides. Note that a single supplementary service may consist of multiple function calls and messages.

Finally, as illustrated by the use of the keypad for controlling speaker volume and microphone gain, and the control information displayed by the LCD panel 124, any of the instrumentalities within a phone device can also be controlled by sending button messages from the display keypad through TAPI to the control program and sending control commands from the control program via TAPI to the phone device. As discussed below in connection with FIG. 11, the phone device itself may contain a programmable microcontroller for controlling the operations of the phone set, and the TAPI interface is commonly used to download specific instructions and commands from the computer to the phone device to implement specific phone device functions. It is important to recognize, however, that the phone device contemplated by the invention provides its own user interface, even though it may call upon the processing service of the connected computer. The phone device of the present invention is designed to mimic the operation of a conventional telephone set during normal operation, as well as to retain all the functionality of a conventional telephone set in the event of a power outage or the failure of a component in, or controlling, the LCD keypad.

Although the supervisory control program operates in the background, requires no attention from the user, and does not require a user interface window on the display screen of the computer 100, a configuration dialog box, callable by the phone device service provider 165 provides a mechanism for obtaining information from the user and displaying information to the user by way of the computer 100. Just as the TAPI API function lineConfigDialog allows a running application program to request the invocation of a dialog box (not shown) supplied with the line service provider DLL, such as UniModem, the TAPI function phoneConfigDialog causes the phone device service provider 165 to display a dialog box (attached to hwndOwner of the calling application) to allow the user to view and configure parameters related to the phone device. The phone device dialog box seen at 169 may be called from the computer 100 in response to a request from the supervisory control program when the user uses the mouse to "right click" on the service providers' minimized icon in the usual fashion to display a popup menu which includes a "Configure" option. Alternatively, a display key on the phone set may display the prompt "Config." in a suitable modestate, and the supervisory program can then respond to the actuation of that key by invoking the phoneConfigDialog TAPI function.

The configuration dialog box 169 may be advantageously employed to display bitmap, directory and billing database maintenance routines, provide a mechanism for identifying and incorporating graphic bitmap files with text to form the downloadable bitmaps for each key in each modestate, and so on. In this way, the functions of the phone device may be programmably configured from either the supervisory control program or from any other telephone management program (illustrated in FIG. 1 by the application program 170) which includes a mechanism for calling the phoneConfigDialog function which may be supported by any TAPI compliant application program. In this way, application programs which were not designed to support the functionality associated with the display keypad 126 may nonetheless configure the phone device 110.

Figure 11:
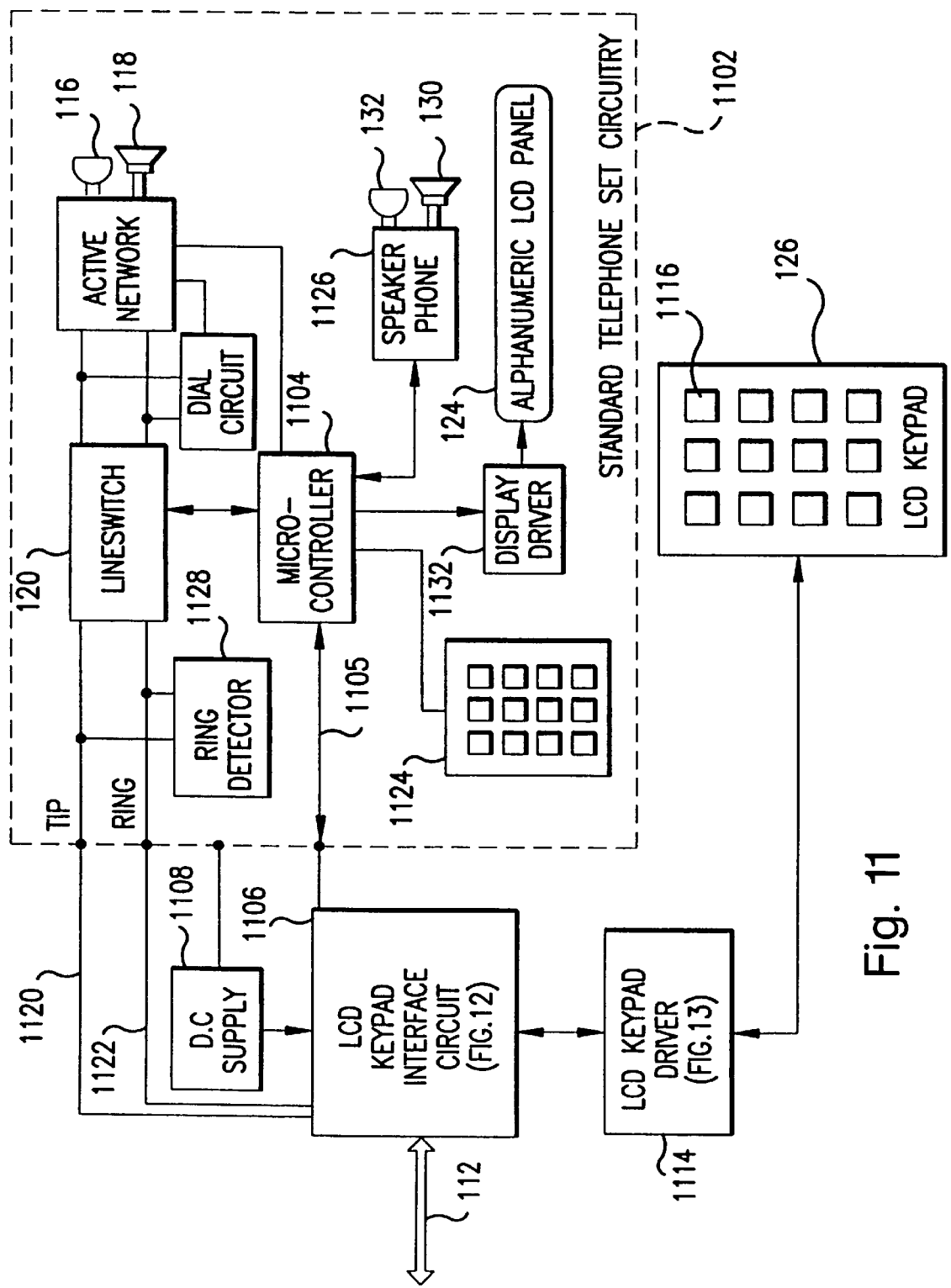
FIG. 11 is a logical block diagram of the phone device used to implement the invention.

FIG. 11 is a logical block diagram showing the preferred embodiment of the phone device, which was shown in block form at 110 in FIG. 1, in more detail. The phone device includes standard multifunction electronic telephone circuitry 1102 which is controlled by its own microcontroller 1104 additionally connected via control lines 1105 to an LCD keypad interface circuit 1106. Powered by a DC power source 1108, the LCD keypad interface circuit 1106 (shown in more detail in FIG. 12) is connected via the 25-line parallel interface connector 112 to the expansion card 140 in the computer 100. The LCD keypad interface circuit 1106 is also connected via LCD driver circuit 1114 (shown in more detail in FIG. 13) to receive button actuation signals from, and send display bitmaps to, the set of twelve LCD keyswitches 1116, arranged in the familiar touch-tone telephone set up of four rows-by-three columns, on the LCD keypad 126.

The multifunction electronic telephone set circuitry 1102 is conventional and is described, for example, in *The Electronics Engineers Handbook*, 3rd ed., by Fink, Donald G. and Christiansen, Donald, eds. (1989) at pp. 22-85–22-86. The telephone set 1102 operates under the control of a dedicated microcontroller as indicated at 1104. Although the preferred embodiment of the present invention utilizes an electronic telephone set as shown in FIG. 11, standard common-battery telephone set circuitry may also be used. The tip and ring telephone lines 1120 and 1122 are connected to the connected dialup telephone network by means of two data input lines in the interface connection 112 to the computer 100.

The microcomputer 1104 in the telephone set 1102 receives information from various functional circuits, such as the conventional touch-tone keypad 1124 which is preferably mounted in the handset 114 seen in FIG. 1 as noted earlier, and responds to this information by controlling other circuits, such as the speakerphone 1126. In the present invention, control instructions may be additionally be downloaded from the computer 100 under the control of the supervisory control program 162 using the TAPI data upload and download commands, permitting the microcontroller 1104 to be programmed in a variety of ways. The TAPI SPI models these phone sets as having one or more download and/or upload areas. Each area is identified by a number that ranges from zero to the number of data areas available on the phone minus one. Sizes of each area may vary and the format of the data itself is device specific to the particular phone set microcontroller. These phone set function download areas are identified by numbers distinct from the area identifiers used to designate the key display bitmaps. The TAPI function TSPI_phoneSetData downloads a buffer of data to a given data area in the phone device RAM which may advantageously be implemented as non-volatile memory so that the phone set, once initialized to perform particular functions, need not be reprogrammed when power is interrupted. Status data and other information may be uploaded from the microcontroller 1102 using the TAPI TSPI_phoneGetData function which uploads the contents of a given data area in the phone device to a designated buffer area in the process space of the running application program using the TAPI interface. When a data area of a phone device is changed, a PHONE_STATUS message is sent to the TAPI DLL's callback to notify the TAPI DLL about the state change. Parameters to this message provide an indication of the change.

Figure 12:
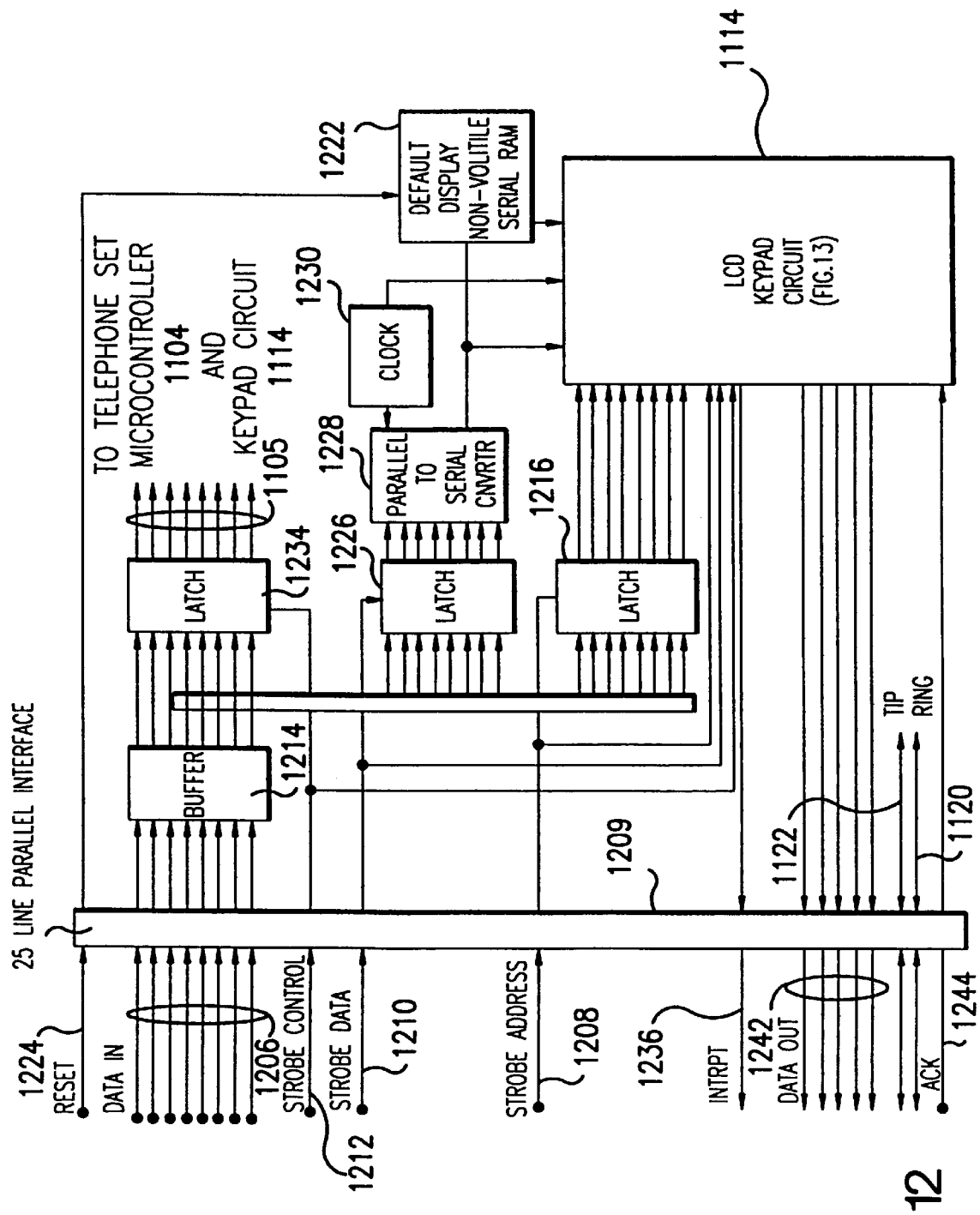
FIG. 12 is a block diagram of one embodiment of the interface circuit utilized in the phone device of FIG. 11.

An illustrative embodiment of the LCD keypad interface circuit 1106 is shown in detail in FIG. 12 and represents an adaptation of the LCD relegendable keypad interface shown in published PCT Application No. WO 95/12843, assigned to Feltscope Limited. The interface circuit 1106 is connected to the 25-line interface connection 112 to the computer 100 seen in FIG. 1 via a standard 25 pin connector 1209 which connects to a standard 25-line interface cable seen at 112 in FIGS. 1 and 11.

Information is transmitted to the phone device 110 from the computer 100 via the 8 data input lines 1206. A buffer 1214 connects the input lines to the inputs of three data latches which receive data under the control of three strobe input lines: the address strobeline 1208, the data strobeline 1210, and the control strobeline 1212. The content of the data on the input data lines 1206 differs depending on which strobeline is activated.

Data is received, eight bits at a time, from computer 100 via the eight data lines 1206 and is placed in parallel into a buffer 1214. If the address strobeline 1208 is activated, the data on input lines 1206 placed in latch 1216 designates a particular data transfer destination for keypad 126 and identifies one of the following: 12 bitmaps destinations, 12 white lamp modes, 12 red lamp modes, and twelve green lamp modes pairs. The presence of a bitmap destination indicates that 512 data bytes (for a 64×64 pixel resolution bitmap) will be transmitted to the identified LCD key, whereas the presence of a lamp address identifies the lamp whose mode will be established by a lamp mode code supplied via data latch 1226.

If the data strobeline 1210 is activated, the data bits received on the data lines 1206 will contain an 8-bit segment of bit map data being sent to a particular LCD keyswitch 1116 to create a specific legend on the LCD, or an 8 bit code indicating a lamp mode setting. Bitmap and lampmode data bits are sequentially latched from the buffer 1214 into a latch 1226 from which they are passed to a parallel-to-serial converter 1228, under the control of a clock 1230, and then to the particular LCD key or lamp register designated by the address previously received into latch 1216.

The keypad interface circuitry may advantageously include a serial, non-volatile memory unit 1222 for holding the default bit maps to be displayed on the LCD keyswitches 1116 whenever the system has been initialized, reset, or powered down. Reset is controlled by the computer 100 via the RESET strobeline 1224 on the 25-way connector block 1110. The default bitmaps advantageously produce a keypad display as those shown in FIG. 4 of the drawings (as used for the MANUAL modestate), except that the "Main Menu" key display is replaced by the display of asterisk "*" to reproduce completely the conventional touchtone keypad symbols. By locally storing the default keypad displays, the display keypad 126 may be used to operate the phone device in the conventional fashion, even when the computer 100 is disconnected or powered down. The non-volatile memory 1222 may be loaded from the computer 100 using the data strobe 1210 when a suitable control code is loaded in the control latch 1234.

If the control strobeline 1212 is activated, the data bits received are passed into a latch 1234 from which they are passed to the telephone set microcontroller 1104 or equivalent phone device mechanisms to control instrumentalities including the speaker phone, the alphanumeric display panel, etc. as previously. The control strobeline 1212 is used to send commands to the standard telephone circuitry illustratively indicated at 1102 in FIG. 11. When the control strobeline 1212 is pulsed, the datalines 1206 will contain bits representing various control commands and are latched from the buffer 1214 to a control bit latch 1234 and thence through conventional circuitry to the microcomputer 1104 or other parts of the interface. The control commands transferred via the datalines 1206 into latch 1234 are codes written by the phone device service provider after being placed in I/O data latches (not shown) in interface circuit 140 seen in FIG. 1, including codes for turning the speakerphone 1126 on or off and changing the volume of the speakerphone or the handset. Control commands may also include character strings sent to the display LCD 1130 under the control of the microcontroller 1104.

Figure 13:
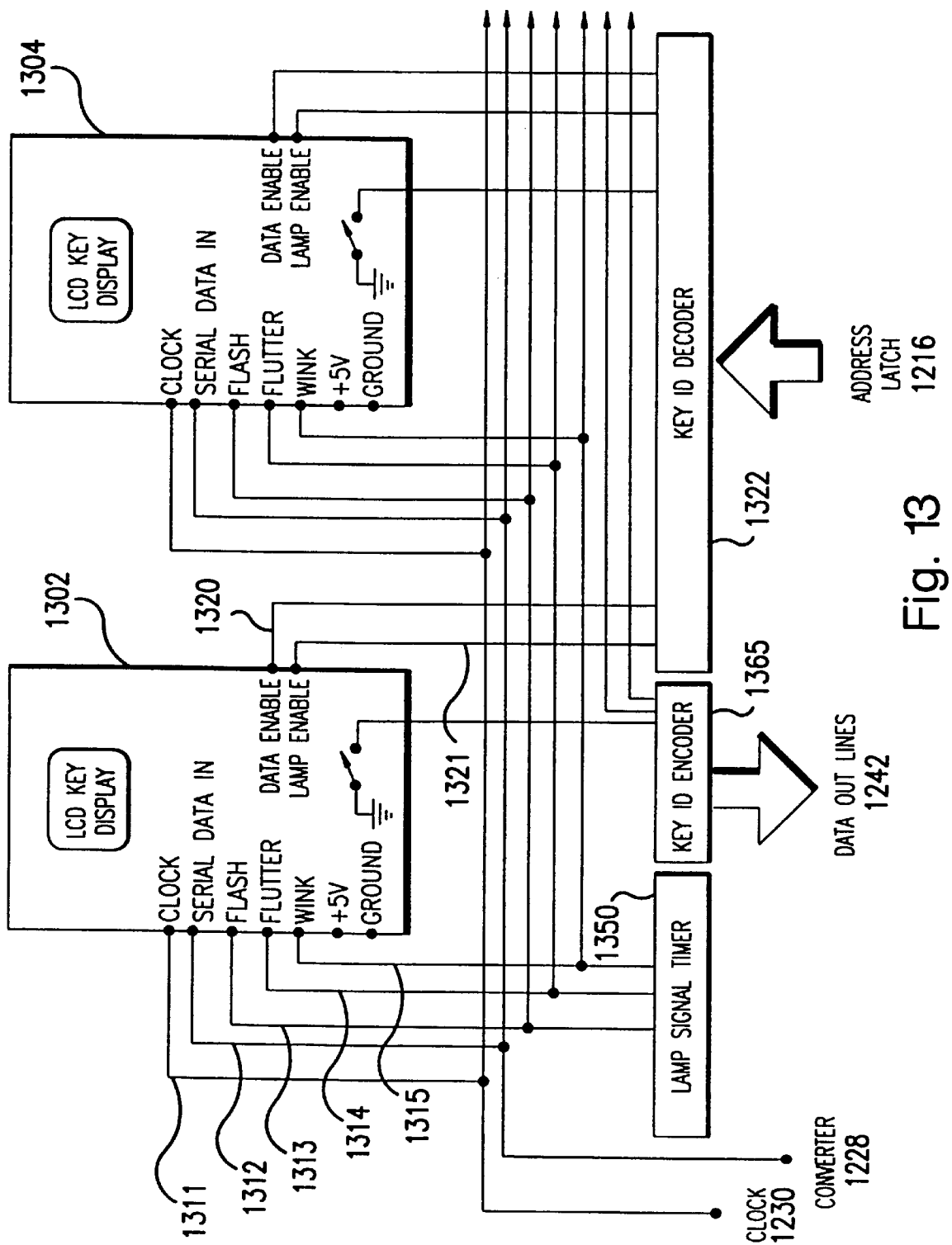
FIG. 13 is a logical block diagram illustrating the interconnections between the LCD keyswitches and the LCD keyswitch driver circuits utilized in the phone device of FIG. 11.

FIG. 13 of the drawings illustrates an illustrative keypad interface logic circuit in more detail. Two of the twelve identical LCD display key modules are indicated in block form at 1302 and 1304. The module 1304 includes a clock signal input 1311 for timing the transfer of serial data into a serial data input 1312 for transferring display bitmaps and backlighting lamp mode selections into the keyswitch module. As noted previously, if the LCD panel in each keyswitch displays a 64×64 pixel bitmap, 512 bytes of data are transferred serially into each keyswitch when the data enable line 1320 is enabled by a key ID decoder 1322 which receives the button/lamp address code from latch 1216 (FIG. 12) indicating the particular button or backlighting lamp for which data is being sent over the serial data line 1312. If the address code indicates that a lamp is being loaded, the serial data line 1312 receives a byte which specifies which lamp (white, red or green) state is to be changed as well as the new mode for that lamp. A lamp mode timing signal generator 1350 provides shared flash, flicker and wink energization signals via the shared lamp power lines 1313, 1314 and 1315 respectively.

When an LCD keyswitch, such as the switch 1350 seen in module 1302, has been depressed or released by a user, this information is converted into the appropriate button action code by a key ID encoder 1365 which sends an interrupt signal via line 1236 in the interface 112 to the connected computer 100 whenever a keyswitch is pressed or released. The interface microcontroller 1220 also receives the 4-bit address (button number) of the particular LCD keyswitch 1116 that was activated. A fifth bit on lines 1242 is used to indicate whether the key activation associated with the interrupt is a key press or a key release. These output bits are transferred via the interface connection 112 to the computer 100 where they are placed on the system databus concurrently with the activation of a system bus interrupt request line. The phone device driver routines 165 include an interrupt handler which formats the button identification into the format defined for a TAPI button message and pass that message via the TAPI SPI to the TAPI.DLL which in turn passes the PHONE_BUTTON message via the applications callback function for handling by the control program thread. The phone device may also supply status information from the microcomputer 1104 using the same hardware/software interface to support those TAPI status reporting functions which characterize the nature and status of the connected phone device.

In the preferred embodiment the twelve LCD display keys such as those seen at 1302 and 1304 house the display in the moveable portion of the key, with the contact portion behind the movable section of the key. Such moveable, relegendable keyswitches suitable for use with the present invention are conventional and are described, for example, in European Patent No. EP-A-0 232 137 assigned to Dowty Electronic Components Limited, to which reference may be made for further details. Alternatively an LCD keyswitch having a fixed display with a transparent moveable cap, such as is described in U.S. Pat. No. 4,897,651 (DeMonte) or British Patent No. GB-A-2 150 722 (Muller), may be used to implement the present invention.

The keyswitches 1302 and 1304 physically move in push-button fashion when pressed and provide tactile feedback to the user. As a result, the display keyswitches operate in a manner fully consistent with the user's experience with the familiar "push-buttons" in conventional touch-tone telephone sets. The similar appearance and feel of the movable keys used to implement the display keyswitches as contemplated by the present invention contributes importantly to the intuitive ease with which the phone device according to the present invention can be used.

In the illustrative embodiment of the invention which has been described, each LCD keyswitch display may be selectively backlit by each of three separate colors, white, red, and green, using several lighting patterns: on full, flashing, flutter, winking or off. Provision of several distinctive lamp colors for keyswitch backlighting is accomplished by associating two lamp/dummy button pairs with one lamp/active button pair and then addressing each lamp individually.

The independent control of backlighting and the bitmap displays permits the application developer to readily provide special capabilities. For example, different colors or lamp modes may be used to differentiate keys which perform functions from keys used merely to display information. Alternatively, different colors may be used to indicate status conditions; for example, keys labeled "Spkr Phone" and "Call Waiting" may be backlit in white when the speakerphone and call waiting are respectively turned off, with each key becoming backlit in green when the indicated function is turned ON. To emulate a key telephone, keys indicating different lines which are active, held, etc. may be backlit in white, white flashing, or red to indicate various states.

Figure 14:
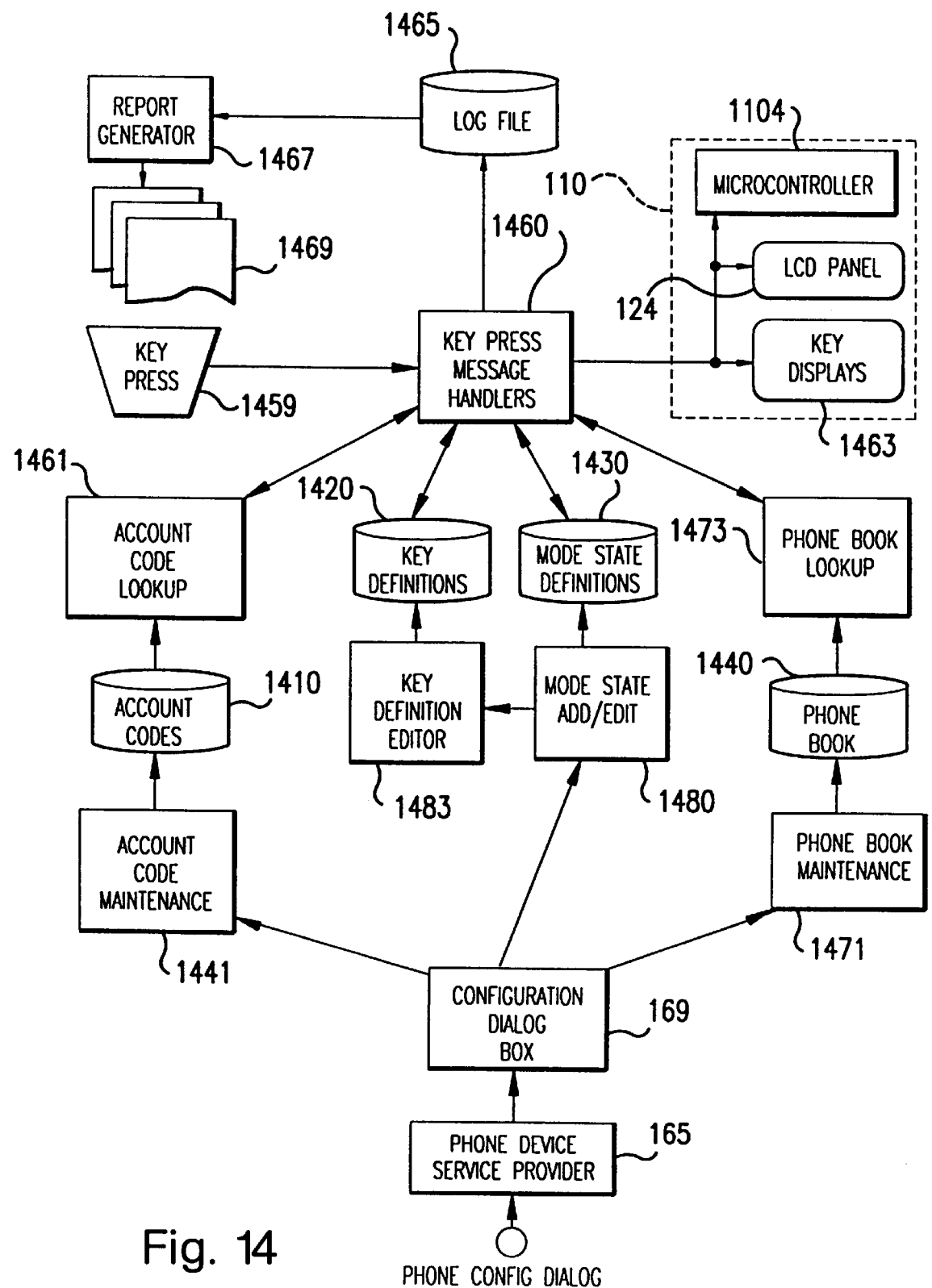
FIG. 14 illustrates the data file mechanism and program flow control used in the preferred embodiment.

FIG. 14 of the drawings shows the principal data structures maintained and manipulated by the preferred embodiment of the invention. These data structures take the form of files persistently stored in the mass storage system of the computer 100 and include an account code file 1410, a key definition file 1420, a modestate definition file 1430, and a phone book file 1440.

The account code file 1410 preferably takes the form of a conventional relational database file containing information about accounts to which particular telephone calls may be charged. The account code file 1410 may typically be an existing database which is maintained by an existing records management system 1441 which may be invoked normally or from the phone device configuration dialog box 169 to add, edit or delete account identification records. When the phone device 110 is in operation, a selected key in a selected state (e.g. the "Bill To" key in the MAIN modestate as depicted in FIG. 3) causes a message handling function at 1460 to invoke an account table lookup function 1461 which returns desired account identifiers from the account code database 1410 to a message handling function at 1460. The account code file 1410 is preferably indexed by a displayable account identifier field so that account identifiers can be accessed and displayed in alphabetical order by name to provide a multi-level access sequence of displayed choices to the user, as illustrated by FIGS. 7 and 8. The message handler converts the received account identifiers into suitable display bitmap form for transmission to the key displays indicated at 1463 in FIG. 14. While a predetermined display bitmap could be stored in each account identification record file to visually designate each account, Windows GDI functions may be advantageously used to convert numeric or character string account identifiers into bitmap data structures suitable for transmission to the key displays 1463. After the user has selected a particular accounting code from the file 1410 using the display keypad, that code is thereafter placed in a telephone connection record, along with connection start and stop times and the identification (telephone number) of the connected party, the resulting connection record being appended to the log file 1465 which may processed at any time by a report generator program 1467 to produce accounting reports as indicated at 1469.

In a similar fashion, the phone book file 1440 may take the form of a relational database which is maintained by a conventional phone book maintenance program 1471 which may also be invoked from the phone device configuration dialog box 169 via the phone service provider DLL 165 in response to a TAPI phoneConfigDialog function invocation by an executing application program as previously discussed. When the user presses a predetermined key in a predetermined modestate (e.g. the "Phone Book" key in the MAIN modestate as seen in FIG. 3), a message handler at 1460 invokes a phone book lookup routine 1473 which returns identification data for designated callable parties, and this identification data is then displayed on the display keys 1463 to permit the user to select the party to be dialed.

The phone book database file 1440 is also advantageously indexed by phone number such that, when caller I.D. services are available from the connected telephone service provider, the telephone number from which an incoming call originates may be checked against the database 1440 and, if a match exists, descriptive text identifying the incoming caller may be transmitted from the database 1440 to the LCD display panel seen at 124 in FIG. 1. In a similar fashion, a short form text description of each callable party in the database 1440 is passed in bitmap form to the display keys 1463 by the lookup routine 1473 to permit the user to select a party to be dialed and, after the connection is established, a longer text description of the party with whom the connection has been established may be transmitted from the database 1440 to the LCD display 124 (as seen in the example of the call in progress modestate display seen in FIG. 10).

In order to program the operation of the phone set 110 from the computer 100, the configuration dialog box 169, at the users request, invokes a modestate editor seen at 1480 which adds, deletes or edits records in the modestate definition database 1430. Records in the file 1430 define each modestate by specifying a modestate variable for each modestate, the default alphanumeric string to be displayed on panel 124 when that modestate is active, and a set of twelve key definition identifiers each identifying a particular key definition in the file 1430. Using the modestate editor 1430, the an installer/developer can create or modify new modestates defining new sets of keys.

The appearance and function of individual keys is determined using a key definition editor 1483 callable from the modestate editor 1480. The modestate editor advantageously displays the appearance of the twelve keys and the LCD panel in graphical form, identifies the modestate name, and permits the user to "right click" on any key display to specify the characteristics of that key.

The key definition editor allows the user to create a graphical bitmap for each key using the Windows GDI from an existing bitmap image or from specified fields in a database containing character or metafile data which can be converted into a bitmap at execution time by the Windows GDI, together with a stored code indicating the default backlighting mode for each backlight color for that key.

In addition to the bitmap and backlight mode definitions for each key, each key definition record in the database 1425 further contains a specification of the functions to be performed when that key is pressed. To this end, the key definition editor 1483 advantageously includes a script file editor for editing a macro language file which specifies the function, or sequence of functions, to be performed when each key in each modestate is actuated by the user. In operation, when a key whose display and backlight mode is defined in a predetermined key definition record is actuated, a keypress message handler then obtains and interprets the macro script recorded for that key in its key definition record, thereby performing previously programmed operations, including switching the system to a new designated modestate and/or performing one or a sequence of functions specified by statements in the script file. The script file for a given key may be readily programmed to perform a script driven sequence of operations to dial and log onto a remote computer and thereafter to perform automated data transfer functions and the like.

When several phone devices are used in a networked environment, the account code file 1410, the phone book file 1440, the mode state definition file 1430 and the key definition file 1420 may be shared by all devices, or may that information may be stored in a combination of shared files containing shared data and locally stored files containing data which is private to a particular user.

Other Embodiments and Applications of the Phone Device

Continued work with the phone device disclosed in the parent of the present patent application has resulted in further development of the software architecture of a preferred embodiment, in the development of low-cost implementations of expansion card 140 and phone device 110, and in increased understanding of environments in which the phone device is useful and of how to implement the phone device in those environments. The following material first describes the software architecture, then the low-cost implementations, and finally the other environments for the phone device.

Figure 25:
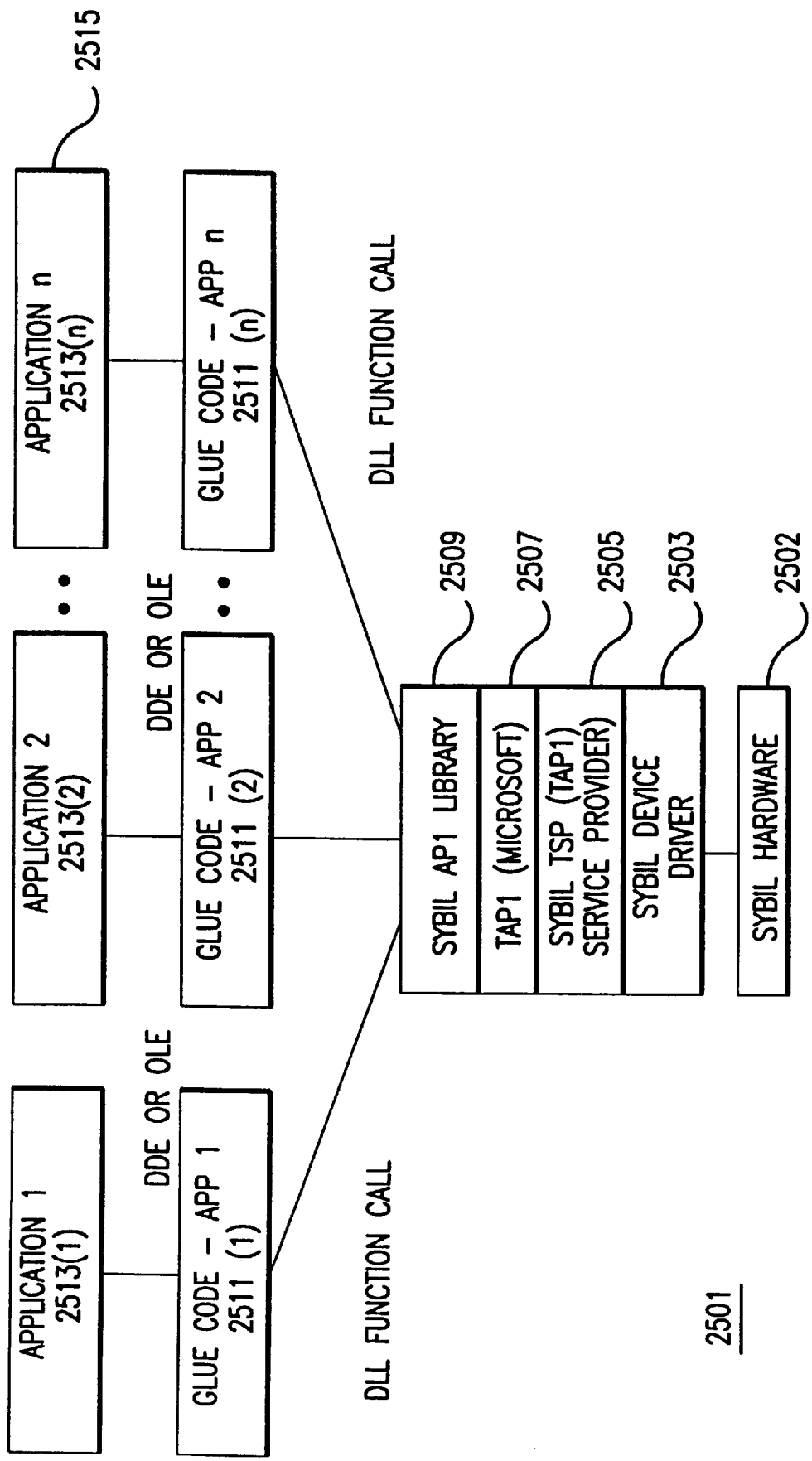
FIG. 25 illustrates the software architecture of a preferred embodiment.

Software Architecture of a Preferred Embodiment: FIG. 25

FIG. 25 shows software architecture 2501 employed in a presently-preferrred embodiment. Beginning at the level closest to hardware 2502, there is device driver 2503, which is the software that directly controls expansion card 140. To do so, it employs a programmer's interface for expansion card 140 which will be explained in more detail below. The next level up is TSP service provider 2505, which provides the interface between the telephony API (TAPI) 2507 provided by Microsoft Incorporated and device driver 2503. The interface between the application programs and TAPI 2507 is provided by Sybil API library 2509. Routines in Sybil API library 2509 are called directly by application programs to control expansion card 140 and phone device 110. The routines and data structures used in library 2509 conform to a standard programming interface such as the Microsoft DDE or OLE interfaces. In Microsoft operating systems, components 2503 through 2509 are all implemented as dynamically-linked libraries, or DLL's, that is, an application program which is to operate with expansion card 140 and phone device 110 links these libraries into its address space when it begins execution.

The application-level layers of the architecture are shown at 2515. As shown there, many applications 2513(i) may use the layers from 2509 down. Applications may be custom-written for telephone device 110, or they may be pre-existing applications which have been adapted to telephone device 110. One example of such an application would be an application for which the original user interaction was by means of displays on a computer terminal and mouse inputs from the users. Such pre-existing applications require the addition of a layer of glue code 2511, which translates between the forms of data required for the application and the forms of data required by expansion card 140 and phone device 110. It should be pointed out here that for many pre-existing applications 2513(i), all that need be written to get the application working on phone device 110 is the corresponding glude code 2511(i).

Low-Cost Implementations of Expansion Card 140 and Phone Device 110

A crucial aspect of the success of any system like the one disclosed in the parent of the present patent application is low cost. Further work on the system disclosed in the parent patent application has resulted in a much lower-cost implementation. Savings have been accomplished by replacing the microcontroller 1104 of the original implementation with four field programmable gate array (FPGA) integrated circuits, three in expansion card 140 and one in phone device 110. Further, in recognition of the fact that virtually all newer personal computers (PC's) include a modem, the implementation now uses the modem in the PC, rather than having its own modem on expansion card 140.

The following discussion of the low-cost implementation will begin with a discussion of the programmer's interface to the expansion card of the low-cost implementation and will then discuss the details of the implementation.

The Programmer's Interface: FIGS. 15–18

The programmer's interface to the expansion card is a set of I/O read and write commands to particular addresses in the I/O address space for the expansion card. Device driver 2503 uses these commands to write data to and read data from registers in the expansion card and to write bit maps and display characteristics to the relegendable keypad. In the following, these commands and the registers will be discussed in detail, beginning with a sequence of commands which serves to unlock the expansion card.

In a preferred embodiment, the computer system in which the expansion card is employed is an IBM-compatible PC. Such PC's are open systems, that is, additions to PCs such as expansion cards are available that perform many different functions and are made by many different manufacturers. There are presently neither clear standards for the design of such expansion cards nor clear definitions of how the various kinds of cards are to interact with each other. A problem with designing expansion cards in such an environment is making sure that the operation of other hardware and/or software components of a given PC do not inadvertently affect the expansion card and that the operation of the expansion card does not inadvertently affect other hardware and/or software components.

This problem is solved in the present implementation of the expansion card by requiring a specific combination of actions by the PC to "unlock" the expansion card. Until the expansion card is unlocked, it will not respond to commands from the PC. This combination of actions is termed herein an access key. Access key 1501 employed in a preferred embodiment is shown in FIG. 15. The key consists of 8 actions which the host system must perform in sequence and without interruption before the present implementation of the expansion card will begin normal operation. As shown in table 1501, the first action is a read by the PC from the expansion card. The next six actions are writes to the address X'8201', which in most PC systems is the address of a game port that is read from and not written to. As shown in the table, each of these writes is accompanied by a predetermined value on the data bus. After the six writes to X8201', the last write is to XC201', which in the unlock sequence is interpreted as the address of a configuration register for the expansion card. The data for the write is the values which the program using the expansion card desires the configuration register to be set to.

The expansion card is locked again when the bus connecting the expansion card to the PC indicates that a system reset has occurred or when a program that is using the expansion card sets a software reset (SWRST) bit in the configuration register. As will be explained in more detail in the following hardware discussion, the lock is implemented in a preferred embodiment by means of a finite state machine which will reach the unlock state only if it receives the specified inputs in the specified order.

The configuration register determines a number of important aspects of the overall behavior of the expansion board and the phone device. There are commands for setting and reading the configuration register; moreover, when a system reset occurs, the configuration register is reset. FIG. 16 shows a preferred embodiment of configuration register 1601. The register contains 8 bits. The first three bits, 0 . . . 2 1603, contain a code which specifies one of eight different ranges of addresses in the host system's I/O address space. Reads and writes on the expansion board are done using addresses in the range specified by the code in 1603. Bit 3 1605 is the SWRST bit. When a program sets the SWRST bit, the expansion board is locked as described above; the SWRST bit is also set when a system reset occurs. Bit 4 1607 is the STD bit. When this bit is 1, the phone device does not display any legends on keypad 126 and operates as a standard POTS telephone using its auxiliary touch-tone keypad. STD bit 1607 is set in two ways: under program control by loading the configuration register or automatically when the expansion board fails to receive a system monitor timer reset command from device driver 2503 within 0.5 seconds after the preceding such command.

The system monitor timer reset command together with the foregoing behavior of the expansion card when STD 1607 is set together provide a mechanism which automatically puts the phone device into POTS mode when the host PC ceases executing the software that controls the expansion board. The system monitor reset command itself is simply an I/O read or write to the base address of the I/O address space for the expansion board. Device driver 2503 must provide the system monitor reset command every 0.5 seconds while it is executing. Device driver 2503 will fail to provide the system monitor reset command under the following circumstances:

The host PC has failed, so that device driver 2503 is not executing.

Device driver 2503 has detected a failure of the PC's operating system.

Device driver 2503 detects operating system failures by periodically polling the operating system. If the operating system does not respond, device driver 2503 ceases sending the system monitor reset command.

Bits 5 . . . 7 1609 in configuration register 1601 select one of eight different interrupt lines in the bus that connects the expansion board to the host system. The selected interrupt line is the one currently being used by the expansion board to send interrupts to the host system.

There is a command for reading the configuration register and a command for writing it. The read command is an I/O read to the current I/O base address for the expansion board+1; the current contents of configuration register 1601 are output to the host on data bits 0 . . . 7 of the bus. The write command is an I/O write to the above address, with data bits 0 . . . 7 carrying the values to be written to configuration register 1601. Note that this write command is different from that used in the key access sequence described above; the read and write commands just described are effective only if the expansion board has been unlocked.

A further register which is not shown in the figures is an 8-bit appliance ID register. It is a read-only register that is set when the expansion board is manufactured to indicate the model number of the expansion board. The command to read the register is the I/O base address plus 6; the contents of the register appear on bits 0 . . . 7 of the data bus.

Figure 17B:
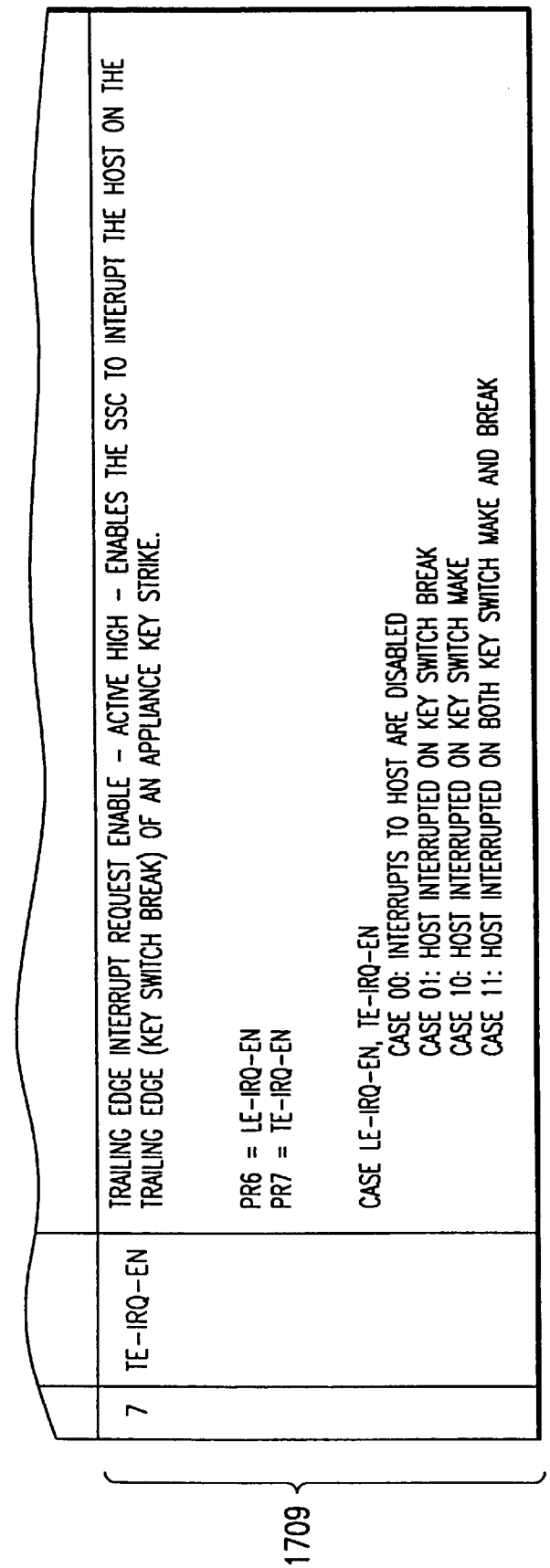
FIG. 17 is a diagram of the key parameter register in the expansion board.

FIG. 17 shows the key parameter register. This register is used by the program on the host to address the keys in keypad 126. When bitmaps are being downloaded, the address in the register indicates which key is receiving the bit map; additionally, the register is used for each key to set whether the host is interrupted when the key is depressed or when it is released and to read the kind of interrupt currently set for the key. Register 1701 contains eight bits, two of which are unused in the preferred embodiment. Bits 0 . . . 4 1703 contain a code which selects one of the 12 keys in keypad 126. For that key, bits 6 1705 and 7 1709 specify the key action which produces an interrupt. There are four possibilities:

| Bit values | Meaning |
|---|---|
| 00 | Disable interrupts from key to host |
| 01 | Interrupt on key switch make |
| 10 | interrupt on key switch break |
| 11 | Interrupt on both key switch make and key switch break. |

The command to write to this table is the I/O write command with an address which is the current base address of the expansion board+5. The bits to be written are on data lines 0 . . . 7. The command to read is the I/O read command with the same address. The bits being read are on data lines 0 . . . 7.

FIG. 18 shows key state register 1801, which is read by the program using the expansion board to determine which key produced the interrupt that the program is presently serving. Register 1801 again contains 8 bits, two of which are spares. Bits 0 . . . 3 1805 contain a code which identifies which of the twelve keys caused the interrupt; bit 6 1807 contains a bit which indicates whether a key which caused the interrupt when it was pressed has yet been released. Bit 7 1809 contains a bit which indicates whether the telephone device is busy, that is, whether it is still downloading a bit map for a previously selected key. Register 1801 must be read by the program using the expansion board whenever the program services a key strike interrupt and whenever the program is doing back to back downloads of bit maps. The command to read the register is the I/O read command with an address formed by adding 8 to the current I/O base address. There is further an interrupt acknowledge command which clears the pending key strike interrupt currently specified in the key state register. The command is an I/O write command to the base address plus 4.

The bit maps for the keys in the key pads and the attributes that determine the key's color and whether the key blinks are set by a sequence of two commands: load start byte followed by load key command/data. Before driver 2503 issues these commands for a key, it sets field 1703 in parameter register 1701 to select the key. The load start byte command is an I/O write command to the base address+2. The byte written contains the value 0, and as will be explained in more detail below, the byte has even parity when it reaches the key set. A load start byte command must precede each load key command/data command. The load key command/data command is an I/O write to the base address+3. What is written to this address is a command byte followed by up to 108 bytes of data. The command and the data have odd parity. The key pad in the preferred embodiment responds to four commands: one which indicates that the following data is pixel data for the key, i.e., the bit map for the key, one which specifies the background color for the key, and two which are used on initialization to specify the refresh rate for the key pad. For further details on programming the key set used in the preferred embodiment, see HE Electronics' Data Sheet for the LC 24.2 TREND keyset used in the preferred embodiment. The data sheet is obtainable from HE Electronics Technologie & Systemtechnik, Am Gneisenauflöz 8, D-66538, Neunkirchen, Germany.

Figure 19:
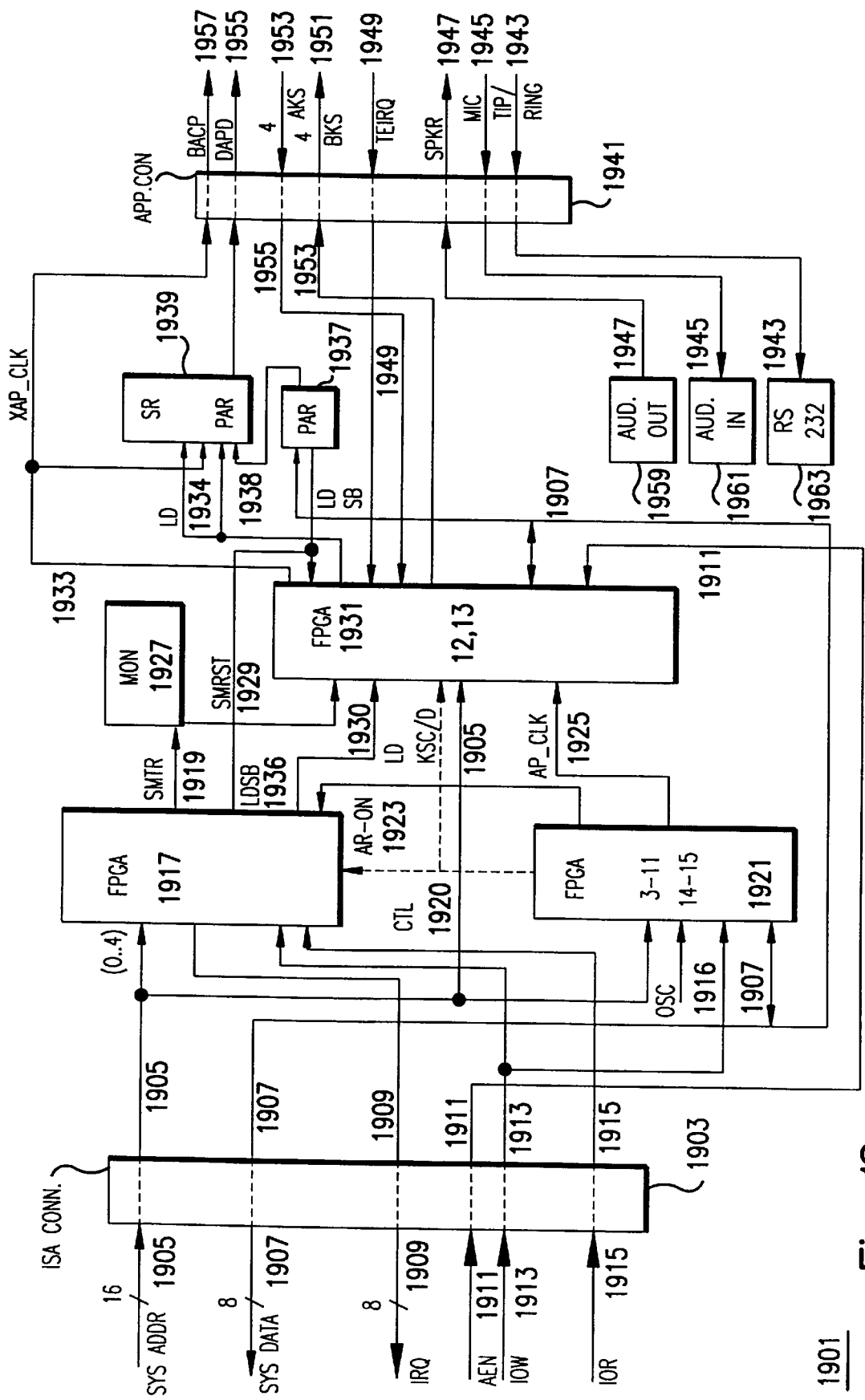
FIG. 19 is a detailed block diagram of the expansion board.

Hardware of the Expansion Board: FIG. 19

FIG. 19 is a high-level block diagram of a preferred embodiment 1901 of the expansion board. The expansion board is connected by an ISA connector 1903 to the host PC's ISA bus and by a cable with a 26-pin connector 1941 to the phone device. Inputs and outputs from the ISA bus are the following:

16 bits of system address 1905. These are input only and are used for the commands.

8 bits of data 1907: these are bidirectional and are used to write to and read from board 1901's registers and to write the bit maps to the keys.

8 interrupt request lines 1909 for outputting interrupt requests from board 1901 to the host PC.

an appliance enable line 191 1 which is activated by the device driver. The line must be active in order for board 1901 to respond to command inputs from the PC.

an IO Write line 1913 for indicating an I/O write operation.

an IO read line 1915 for indicating an I/O read operation. The lines from board 1901 to the phone device are shown at appliance connector 1941:

BACP 1957 provides a clock signal from board 1901 to the telephone device. When this clock signal ceases, the telephone device functions as a POTS telephone.

DAPD 1955 is a serial data line which transfers the bit map data to the key pad.

AKS (0 . . . 3) 1953 is four lines which the telephone device activates to indicate which key of the key pad has been pressed.

BKS (0 . . . 3) 1951 is four lines which board 1901 activates to indicate the key that the data being downloaded is intended for.

TEIRQ 1949 is an input from the keypad to board 1901 which indicates that the key that has been pressed has been released.

the remaining inputs and outputs are analog inputs and outputs that connect analog devices in the host system to analog devices in the telephone device. SPKR 1947 receives its input from jack 1959 and outputs the signal to a speaker in the telephone device; MIC 1945 receives its input from a microphone in the telephone device and outputs the signal to jack 1961; TIP/RNG 1943, finally is three sets of tip/ring lines. In the preferred embodiment, only two sets are used, one for the telephone device and one set for a fax machine that may be connected to the telephone device, and one set for a jack in the telephone device. Both sets of lines go to RJ11-4 jacks which permit the telephone device to be connected to wall telephone outlets as well as to the PC.

Between ISA connector 1903 and appliance connector 1941 are coupled three field programmable gate arrays 1917, 1921, and 1931. The gate arrays employed in the preferred embodiment are devices belonging to the MAX 7000 programmable logic device family manufactured by Altera Corporation, 2610 Orchard Parkway San Jose, Calif. Further information about the gate arrays may be obtained from Altera Corporation's data sheet for the parts.

The gate arrays implement the registers specified in the programmer's interface to board 1901 and also implement the control logic necessary to execute the commands. The division of functions among the arrays can generally be characterized as follows:

Array 1917 decodes address lines 1905 (0 . . . 4), which specify the various operations and further decodes interrupt select information lines from gate array 1921 to activate the proper ones of interrupt request lines 1909.

Array 1921 implements configuration register 1601 and the application ID register, derives a clock signal AP_CLK 1925 used to control the telephone device from an oscillator, and implements the state machine which unlocks board 1901.

Array 1931 implements key parameter register 1701 and key state register 1801 and further controls the interaction of board 1901 with the telephone device. In particular, array 1931 implements the commands which load the key bit maps and set the display attributes and also receives inputs indicating which keys have been actuated.

Continuing in more detail with the implementation of three operations performed by board 1901, namely unlocking, detecting a failure in the host PC, and loading bit maps, the unlocking, as previously explained, is implemented as a state machine. Each of the inputs described in table 1501 puts the state machine into the next state; when all of the states have been completed, FPGA 1921 activates line AP_ON 1923, which enables FPGA 1917 to begin responding to the commands received on the least significant bits of the I/O base address.

As previously indicated, the program in the host PC which is controlling board 1901 must issue a system monitor timer reset command at least once every 0.5 seconds. In a preferred embodiment, FPGA 1917 responds to the command by activating line SMTR 1919, which is connected to monitor 1927. In board 1901, monitor 1927 is a counter, and SMTR 1919 resets the counter. If the counter is not reset, it reaches its maximum value and activates line SMRST 1929, which goes to FPGA 1931. FPGA 1931 responds to SMRST 1929 by ceasing to output XAP_CLK 1933, a clock signal derived from AP_CLK 1925. XAP_CLK 1933 is output to the telephone device as BACP 1957, and when this signal ceases, the telephone device begins functioning as a standard POTS telephone.

The discussion of the programmer's interface disclosed that downloading of bitmaps to the telephone device was done by means of sequences of load start byte and load command/data commands. Each load command/data command downloads up to 108 bytes of data received on SYSDATA (0 . . . 7) 1907 to the key specified by BKS (0 . . . 4) 1951. The telephone device distinguishes the byte provided by the load start byte command from the bytes provided by the load command/data command by the fact that the former byte has even parity, while the latter have odd parity.

Gate array 1917 responds to the load start byte command by activating LDSB 1935, which is received by gate array 1931 and parity generator 1937. Gate array 1931 in turn responds by outputting LD signals 1934 to shift register 1939, which cause shift register 1939 to load the byte of data on SYSDATA 1907. The byte is preceded by a start bit and followed by a parity bit and two stop bits. The start bit and stop bits are generated by shift register 1939. At the same time, parity generator 1937 responds to LDSB 1935 by outputting even parity 1938 for the byte on SYSDATA 1907 to shift register 1909. Once the byte is loaded, it is output from the shift register under control of XAP_CLK 1933 to connector 1941.

The same general pattern is followed with regard to load command/data. Gate array 1917 responds to the load command/data command by activating LDKSC/D 1930, which is connected to FPGA 1931. FPGA 1931 then activates LD 1934, which causes shift register 1939 to load the byte on SYSDATA 1907. This time, parity generator 1937 is not activated and the parity bit for the byte is not reversed. Once loaded, the byte is output from shift register 1939 as described above.

Figure 20:
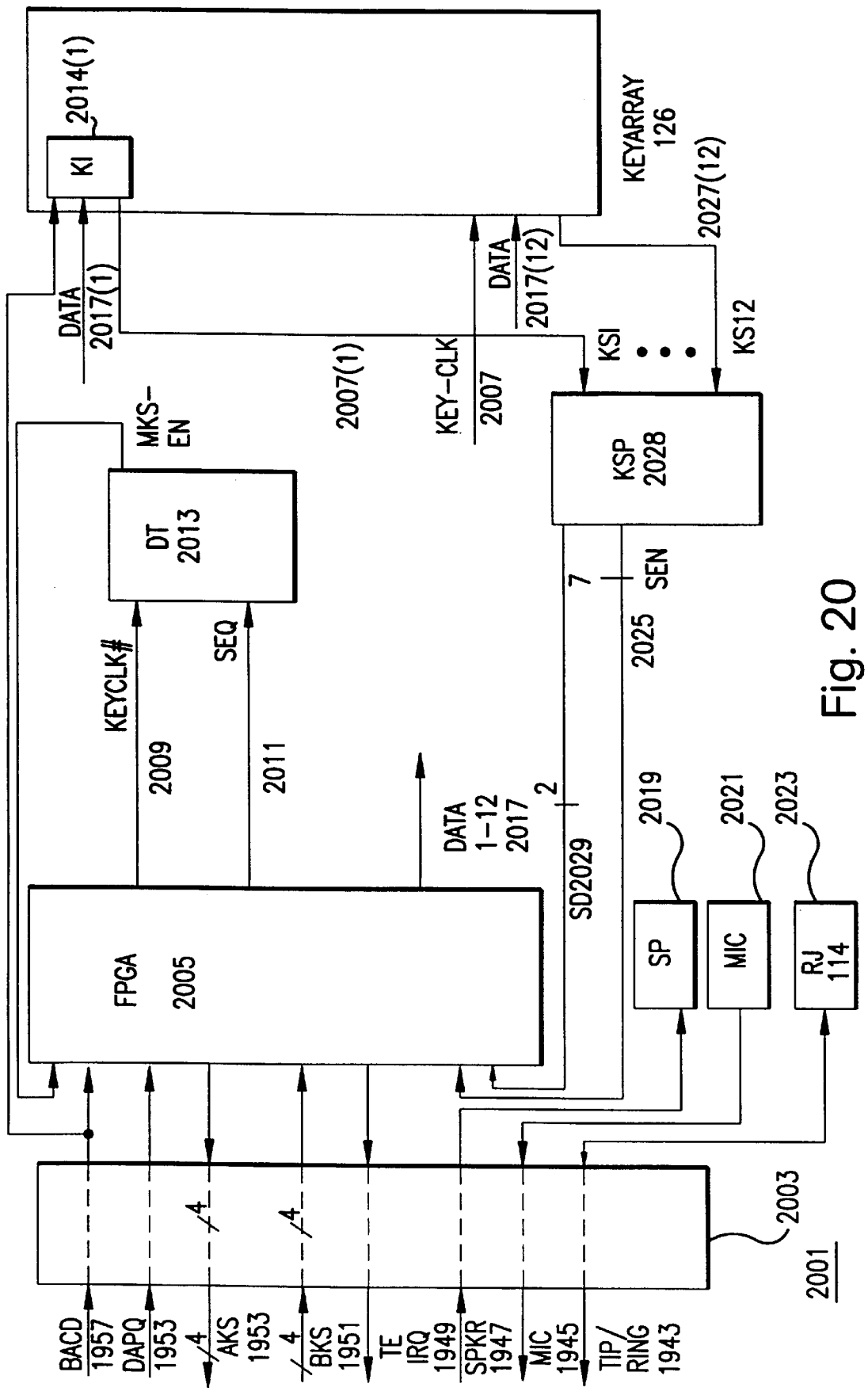
FIG. 20 is a detailed block diagram of the telephone device.

Hardware for Telephone Device 110: FIG. 20

FIG. 20 shows the cost-reduced presently-preferred embodiment 2001 of telephone device 110. Embodiment 2001 is connected by cable to expansion board 1901; the signals carried between telephone device 2001 and expansion board 1901 have already been explained in the discussion of expansion board 1901 above. The analog signals, SPKR 1947, MIC 1945, and the tip/ring signals 1945 go to the relevant devices in telephone device 110 and also to the RJ RJ11-4 jack. The digital signals load data for the keys in keypad 126 and respond to signals from keypad 126. As shown there, each key 2018(i) has two inputs and an output. The inputs are a clock signal, KEY_CL 2007, which is derived from BACP 1957, provided by expansion board 1901, a serial data line, DATA 2017(i), which carries the data for key 2018(i)'s bit map and for setting key 2018(i)'s display attributes, and KS 2027(i), which indicates whether key 2018(i) is currently depressed.

Coupled between cable socket 2003 and key array 126 is field programmable gate array 2005, which contains the control logic necessary to transfer the data received on DAPD 1955 to the key specified by BKS (0 . . . 3) and to translate an input from a KS 2027(i) to an output on AKS 1953 indicating which key 2018(i) was depressed. Beginning with the transfer of the data to the keys, FPGA 2005 receives clock signals on BACP 1957 and serial data on DAPD 1955 and outputs the data on DATA(i) for the key 2018(i) currently specified by BKS(0 . . . 3) 1951. The data is clocked into key 2018(i) by KEY_CLK 2007, which is derived from BACP 1957. It should be noted here that when KEY_CLK 2007 is not regularly transmitting a clock signal, key array 126 cannot be loaded and also does not refresh the displays of the currently-loaded bitmaps.

Continuing with the transfer of keystroke information, the information is produced when a key 2018(i) is depressed or released. There are two problems that must be solved with this information: first, keys generally do not simply go on or off, but "bounce" before they finally reach one or the other state. Second, expansion board 1901 and the software using board 1901 in a presently-preferred embodiment expect a signal indicating that only one key 2018(i) has been depressed; it is, however, possible either accidentally or intentionally to depress more than one key simultaneously.

The problem of simultaneous key depressions is solved by keystroke prioritizer 2028, which responds when more than one line KS 2017 is active by selecting one key 2018 according to a predetermined priority. That a keystroke has occurred is indicated by the values on the lines SD 2029. Which key has been selected is indicated by the values on the lines SEN(0 . . . 6) 2025. Both these lines and lines SD 2029 are inputs to FPGA 2005. The values on those lines will, however, reflect "bounce", and consequently, FPGA 2005 does not respond to SEN (0 . . . 6) 2025 until after a delay of 10 MSEC. This delay is produced by delay timer 2013. When SD 2029 indicates that a key has been struck, FPGA 2005 activates line SEQ 2011, which in turn starts delay timer 2013 running. When it has run for 10 MS, it activates the line MKS_EN 2015, which is an input to FPGA 2005. When this line is active, FPGA 2005 determines from the state of the lines SEN (0 . . . 6) 2025 which key was pressed and activates lines AKS(0 . . . 3) 1953 accordingly. If none of lines SEN(0 . . . 6) is active, when MKS_EN 2015 is active, FPGA 2005 activates TE_IRQ 1949.

Delay timer 2013 also serves to inhibit activation of lines AKS(0 . . . 3) when the PC that contains expansion card 1901 has failed. As previously indicated, when the PC fails, BACP 1957 ceases to provide a timing signal. The timing signal KEY_CLK# 2009 is derived from BACP 1957, and when that timing signal ceases, so does KEY_CLK# 2009. That in turn stops operation of delay timer 2013, which in turn prevents MKS_EN 2015 from being generated, and thereby inhibits activation of AKS(0 . . . 3).

Figure 21:
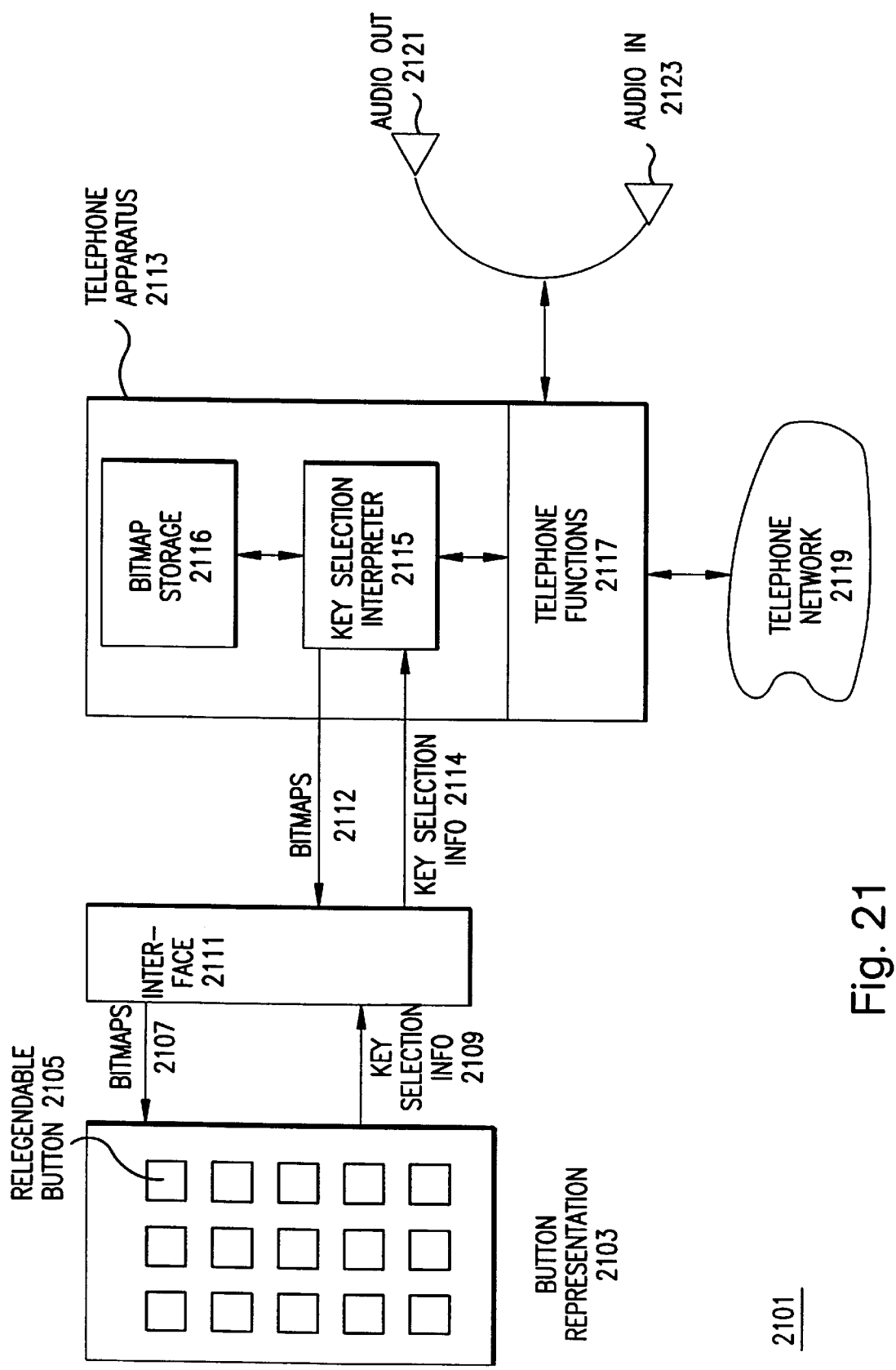
FIG. 21 is a generic diagram of a system embodying the invention.
Figure 22:
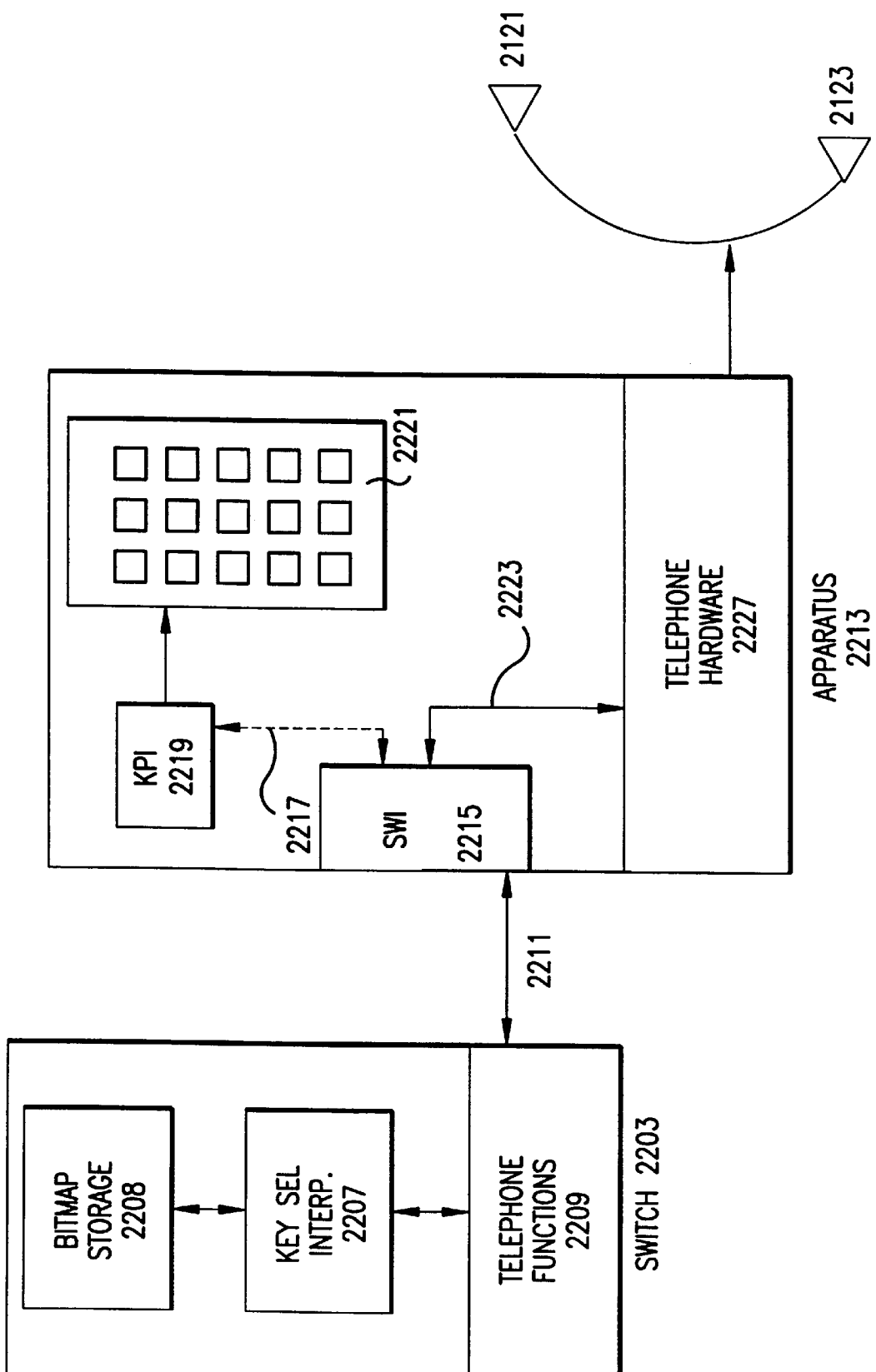
FIG. 22 is an embodiment in which the invention interacts directly with a telephone switch.
Figure 23:
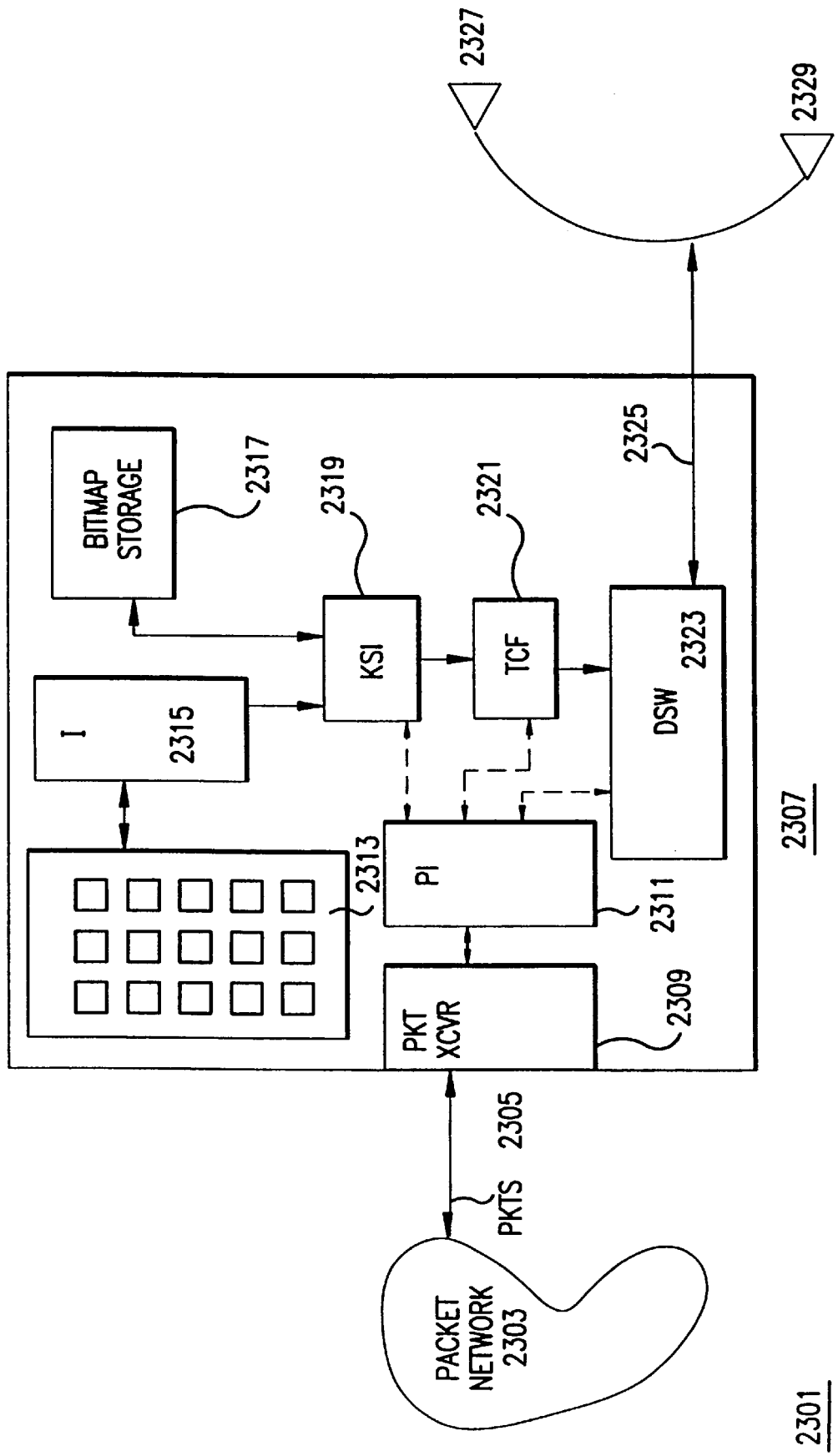
FIG. 23 is an embodiment of the invention which interacts directly with a packet network.

The Genus and other Species of the Apparatus: FIGS. 21–23

Further work on the apparatus disclosed in the parent of the present patent application has made it clear that the apparatus may be implemented in many ways and may be used in many different environments for providing telephony services. Certain features of the apparatus are, however, common to all of the implementations and environments considered thus far. These features are shown in FIG. 21. System 2101 of that Figure has three principal components: button representation 2103, interface 2111, and telephony apparatus 2113. Button representation 2103 may be a keypad such as keypad 126 with relegendable push buttons or it may be a representation of a keypad in the display of a computer system. In the latter case, the buttons are again relegendable, but are selected by means of a pointing device such as a mouse or stylus. In either case, button representation 2103 receives bitmaps 2107 representing button legends from interface 2111 and returns key selection information 2109 indicating which button 2105 has been selected by the user.

Interface 2111 puts the information provided to button representation 2103 and received from button representation 2103 into the proper form for transmittal to telephony apparatus 2113. Thus, in the preferred embodiment, it receives bitmaps 2112 and directs them to their intended keys and "debounces" key selection information 2109 and encodes it as keystroke information 2114.

For present purposes, telephony apparatus 2113 can be considered to have three main components: bit map storage 2116, which stores the bit maps 2112 that are sent to button representation 2103, keystroke interpreter 2115, which responds to a selection of a button 2105 by a user of button representation 2103 by activating a telephony function 2117 and/or sending one or more new bitmaps 2112 to interface 2111, and telephony functions 2117, which manage the interfaces to telephone network 2119 and telephone audio in 2123 and audio out 2121. Telephony apparatus may do any kind of wired or wireless telephony, including packet telephony. The connections between interface 2111 and telephony apparatus 2113 may also be wired or wireless.

System 2101 operates as follows: when a user selects a button 2105, button representation 2103 provides key selection information 2109 to interface 2111, which puts it into the proper form 2114 for telephony apparatus 2113. Key selection interpreter 2115 responds as required by the present set of bit maps being displayed in representation 2103. In some cases, the required response is a telephony function, and interpreter 2115 activates the required functions in telephony functions 2117. In others, the required response is a new set of bitmaps and interpreter 2115 retrieves the required bitmaps and provides them to interface 2111, which in turn provides them to button representation 2103. In still others, interpreter 2115 both activates telephony functions and provides bit maps. There are many ways in which the components of system 2101 can be distributed across hardware devices. There are also many ways in which the components can communicate with each other and with the telephone system. In the presently-preferred embodiment, the communication with the telephone system is analog, while the communication of control information between the telephone device and the PC is digital, and the cable used to connect the telephone device contains both lines for the digital signals and lines for the analog signals. In other embodiments, the connection between the telephone device and the PC may be by means of a LAN on which the digital signals are carried in packets, and in still other embodiments, the telephone system may be a packet telephone system and the voice signals as well as the digital control information will be carried in packets.

In one class of implementations, there is a single hardware device, namely a personal computer or workstation, in which all components of system 2101 are implemented. In this implementation, button representation 2103 is displayed on the display of the PC and the audio in and out are provided by a telephony board in the PC. In the presently-preferred implementation, button representation 2103, interface 2111, and audio out 2121 and audio in 2123 are part of a separate device which is connected to a PC that implements telephony apparatus 2113. The telephony apparatus may either do analog telephony or digital packet telephony. Of course, in embodiments in which the entire system 2101 is implemented in a PC or in which at least button representation 2103 is part of a separate device that is connected to the PC, the buttons in button representation 2103 may be used to interact with programs other than telephony programs in the PC. Examples of such programs might be programs used to display data relevant to a telephone call which is being made using system 2101.

In other embodiments, there may be a separate device as just described and telephony apparatus 2113 may be a PBX switch or even a central office switch instead of the PC. Communication with the switch may be completely analog, in which case the digital information will be transferred by modem or by means of DTMF signals, it may be mixed analog and digital, as in the presently-preferred embodiment, or it may be completely digital. In the latter case, the separate device can be connected to the telephony apparatus by any kind of packet network. Indeed, the telephony apparatus may in fact be a server for a packet network to which a number of the separate devices communicate by means of a protocol such as the Ethernet protocol (Ethernet is a registered trademark of Xerox Corporation). Such servers can of course be implemented on any kind of computer, including a PC. In still other embodiments, the separate device may itself contain telephony apparatus 2113 and be connected directly to telephone network 2119. This variation is particularly attractive for packet telephony, since typical packet networks restrict themselves to routing functions, with all other functions being performed by intelligent devices at the edges of the network. Of course, where the separate device is an independent packet telephone, it still may be connected via a packet network to a server and to other such packet telephones and the server can implement the functions performed in the preferred embodiment by the PC. Such an arrangement would be particularly well-adapted to a departmental telephone system.

Bitmap storage 2116 may also be located in different components. Maximum flexibility is attained if it is downloadable and located in the separate device. In such an embodiment, the portion of key selection interpreter 2115 which selects bitmaps would also be located in the separate device. Devices which download bitmaps may also download the code which key selection interpreter 2115 requires to properly interpret the keystrokes arising from the bitmaps.

FIG. 22 shows an implementation 2201 in which an apparatus incorporating keypad 2221, audio output 2121, and audio input 2123 is connected directly to a telephone switch 2203. In this implementation, bitmap storage 2205 and key selection interpreter 2207 are in switch 2203, together with all of the telephony functions 2209 except those required in apparatus 2213 to respond to an incoming call. Switch 2203 is connected by means of path 2211 to apparatus 2213. Path 2211 must carry both the standard analog audio signals necessary for telephone calls and the digital information necessary for interactions with keypad 2221. One way of carrying both kinds of information is to encode the digital information as sequences of DTMF tones; another is to include modems in both switch 2203 and apparatus 2213 and use the modems to send the digital information. Still another way is to provide separate circuits for the digital information and the audio signals. In any case, switch interface 2215 must provide the digital information via path 2217 to keypad interface 2219 and the analog information to telephony hardware 2227 via path 2223.

The problem of transmitting both the audio information and the digital information between the switch and the apparatus is solved if the apparatus is connected to a packet network. In such a network, all information is carried as packets of digital data, with the type of the packet indicating how the receiving device is to interpret the digital data. FIG. 23 shows a telephone system 2301 with a stand-alone apparatus 2307 for connection to a packet network 2303. Apparatus 2307 has an address in packet network 2303 and receives packets 2305 from network 2303. These packets are retrieved from the medium over which they are transmitted by packet transceiver 2309, which puts them into the form used internally in apparatus 2307. Packet interface 2311 receives incoming packets 2305 from transceiver 2309 and distributes the packets according to their types to the components of apparatus 2307. Interface 2311 also outputs packets produced by the components to transceiver 2309, which places them in the form proper to the transmission medium.

For present purposes, the components of apparatus 2307 can be divided into three groups: those which deal with keypad 2313, those which perform telephony control functions, and those which handle packets containing audio data. The packets containing audio data are handled by DSP hardware 2323, which receives such audio packets from interface 2311, translates them into analog audio signals, and outputs the audio signals to audio output 2327. DSP hardware 2323 also does the reverse, receiving analog audio signals from audio input 2329, digitizing the audio signals, and placing them in packets for output to network 2303. Telephony control functions 2321 interpret and generate packets containing control messages which determine the behavior of packet network 2302 and of telephony devices attached to it. In this function, TCF 2321 responds to inputs from key selection interpreter 2319 as well as to control packets received over the network. TCF 2321 further not only produces control packets for transmission via network 2303, but also provides control signals to digital signal processor 2323. Keypad 2313, key selection interpreter 2319, interface 2315, and bitmap storage 2317 work as previously described, except that keystroke interpreter 2319 interacts with telephone control functions 2321. In some embodiments, keystroke interpreter 2319 will also be able to receive packets containing bitmaps and programs from packet network 2303. The bitmaps would of course be loaded into bitmap storage 2317, while the programs would become part of key selection interpreter 2319.

Because devices attached to packet network 2323 interact with each other and not with packet network 2313, which only routes packets, it is possible for a device 2307 connected to the packet network to interact with other devices, including other devices 2307 connected to the packet network in any number of ways. All that is required for a given device connected to the packet network to permit the user of a device 2307 to interact with the given device is for the given device to send device 2307 the bitmaps and programs that are needed for the interaction. There is no need to change packet network 2303 to accommodate the new interaction. As indicated above, packet network 2303 may be any kind of packet network, from a public packet network through a local area network to a network connecting a number of devices 2303 to a PC, and the local network may be connected to the public network by a router (which may of course be the PC). The actual medium over which the packets are transmitted may be anything which serves the purpose, from twisted pair through optical fibers to wireless.

Figure 24:
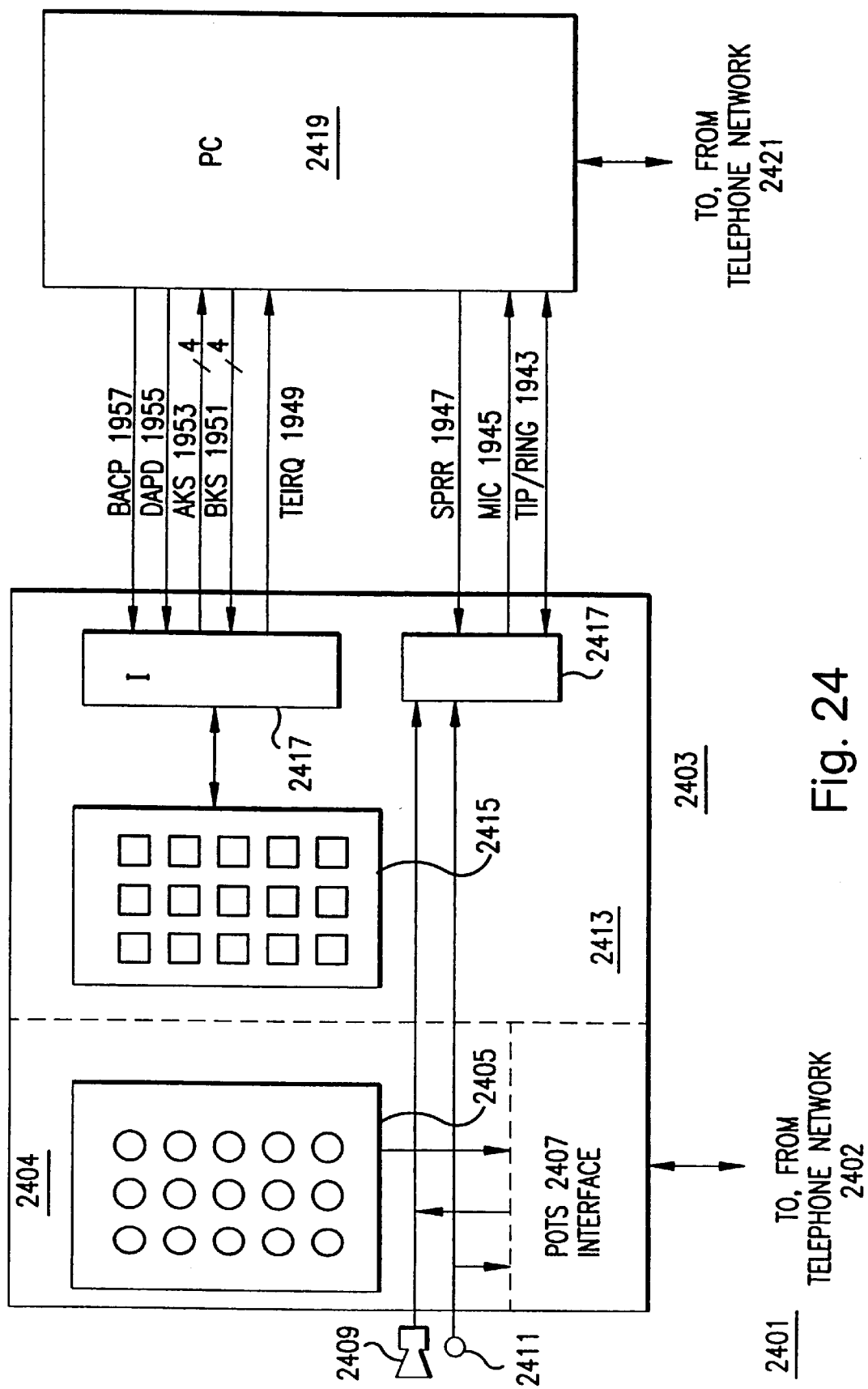
FIG. 24 illustrates the fail-safe features of a preferred embodiment.

Failsafe Telephony Apparatus: FIG. 24

A problem with any digital telephone system is that the system ceases to function when the digital components fail. The most common cause of failure is an electrical power outage. The analog telephone system is self-powered, that is, the telephone receives enough power over the telephone lines to perform POTS functions. The analog telephone system thus continues to function during an electrical power outage. The power provided over the telephone lines is, however, not suitable for digital systems, and consequently, most such systems receive their power from the standard electrical power system. When there is a power outage, the systems cease functioning.

In the case of the preferred embodiment of system 2101, telephony apparatus 2113 is a PC. PC's are of course subject not only to power failures, but also to power surges, and further execute software which is full of bugs. As indicated in the parent of the present application and explained in more detail in the description of PC expansion card 1901 above, the presently-preferred embodiment of the invention responds to a failure of the PC by switching to POTS service. The system thus provides telephone communication as long as POTS service is available from the phone system. FIG. 24 provides an overview of the techniques used in the preferred embodiment to make this possible. In system 2401, all of the functionality necessary to provide bitmaps for and respond to relegendable keypad 2415 is provided by personal computer 2419, and consequently, none of that functionality is available when personal computer 2419 is not operative, either because of a power failure, because of a power surge, or because of a software bug which has caused the PC to crash or hang. Further, when apparatus 2403 is operating under control of PC 2419 and relegendable keypad 2415, PC 2419 provides connection 2421 from apparatus 2403 to the telephone network. This connection, too, fails when PC 2419 fails.

Apparatus 2403 remains usable when PC 2419 fails because it has a set of components 2404 which permit it to operate as a standard POTS telephone. The components include non-relegendable keypad 2405, POTS interface 2407, and separate connection 2402 to the telephone network. Keypad 2405, speaker 2409, and microphone 2411 are all coupled to POTS interface 2407, and consequently, apparatus 2403 can continue to provide POTS telephone service as long as the telephone network itself is available. The connection to telephone network 2402 may be directly to a subscriber loop or to a PBX which is in turn connected to a subscriber loop. To ensure that the user of apparatus 2403 is aware that portion 2413 under control of relegendable keyboard 2415 is inoperable, expansion card 1901 in PC 2419 responds as previously described to a failure of PC 2419 by ceasing to provide clock signal BACP 1957 to portion 2413. Interface 2417 then no longer provides clock signals to keypad 2415, interface 2407 does not respond to inputs from keypad 2415, keypad 2415 does not refresh the bit maps, and the legends and their colored backgrounds disappear. When portion 2413 is in this state, the user simply employs keyboard 2405.

Conclusion

The foregoing Detailed Description has disclosed to those skilled in the arts to which the invention pertains how to make and use a telephone device which employs a relegendable representation of a standard telephone key pad to interact with other telephony apparatus such as a switch or a server that is performing telephony functions. While the Detailed Description discloses the best mode presently known to the inventors for implementing their invention, it will be immediatedly apparent from the Detailed Description and from the nature of the invention itself that different kinds of embodiments that employ the principals of the invention may be constructed. There are many ways in which the components of the invention may be distributed across telephone devices and servers or switches and many ways in which the components of the invention may communicate with each other and with the telephony system. Moreover, the invention may be employed in any kind of telephone system, be it wired or wireless, analog or digital.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A user interface device for initiating a telephony function for a user, the telephony function being performed in a first apparatus that performs telephony functions, the user interface device comprising:
  a representation of a set of buttons, the buttons being relegendable and manipulatable by the user and the locations of the buttons relative to each other remaining substantially constant; and
  a device interface to the first apparatus, the device interface providing a first indication of a plurality thereof from the user interface device to the first apparatus that a manipulation by the user has selected a button and providing second indications of legends from the first apparatus to the user interface device, the second indications of legends indicating legends for the buttons and the first apparatus responding to the first indication by providing at least one of the second indications to the device interface and/or for at least some of the indications, initiating the telephony function.

2. The user interface device set forth in claim 1 wherein:
  the first apparatus that performs telephony functions performs other functions; and
  the first apparatus further responds to the first indication by providing the legends to the interface and/or performing one or more of the other functions.

3. The user interface device set forth in claim 1 wherein:
  the device interface further provides a failure indication from the first apparatus to the user interface device, the failure indication indicating that the first apparatus is not functioning properly and
the user interface device further comprises:
  failure response apparatus which responds to the failure indication by disabling the representation of the buttons.

4. The user interface device set forth in claim 3 wherein:
  the failure response apparatus disables the representation by ceasing to provide the first indication to the first apparatus.

5. The user interface device set forth in claim 4 wherein:
  the failure response apparatus causes the representation of the buttons to cease to display the legends.

6. The user interface device set forth in claim 3 further comprising:
  second apparatus that performs telephony functions, the second apparatus not being affected by a failure of the first apparatus.

7. The user interface device set forth in claim 6 wherein:
  the second apparatus further comprises a telephone keypad.

8. The user interface device set forth in claim 7 wherein:
  the second apparatus performs analog telephony functions.

9. The user interface device set forth in any of claims 1 through 8 wherein:
  the first apparatus and the user interface device communicate using a digital interface.

10. The user interface device set forth in claim 9 wherein:
  the digital interface is a digital packet interface.

11. The user interface device set forth in any of claims 1 through 8 wherein:
  the representation is a relegendable keypad with at least 12 buttons.

12. The user interface device set forth in any of claims 1 through 8 wherein:
  the first apparatus is a computer system.

13. The user interface device set forth in claim 12 wherein:
  the computer system performs packet telephony functions.

14. The user interface device set forth in claim 12 wherein:
  the computer system includes an expansion element coupled to the device interface, the expansion element becoming operable only after having received a predetermined sequence of commands from the computer system.

15. The user interface device set forth in any of claims 1 through 8 wherein:

the first apparatus is a telephone switch.

16. The user interface device set forth in claim 15 wherein:

the user interface device and the telephone switch communicate via a digital interface.

17. The user interface device set forth in claim 16 wherein:

the digital interface is a digital packet interface.

18. The user interface device set forth in any of claims 1 through 8 wherein:

the first apparatus performs packet telephony functions.

19. The user interface device set forth in any of claims 1 through 8 wherein:

the first apparatus performs wireless telephony functions.

20. The user interface device set forth in any of claims 1 through 8 wherein:

the first apparatus is a private branch exchange.

21. The user interface set forth in any of claims 1 through 8 wherein:

the user interface device includes the first apparatus.

22. The user interface set forth in claim 21 wherein:

the first apparatus performs packet telephony functions.

23. The user interface set forth in claim 21 wherein:

the first apparatus performs wireless telephony functions.

24. The user interface apparatus set forth in any one of claims 1 through 8 wherein:

the telephony apparatus responds to the indication by providing second indications to the interface such that at least some of the buttons in the set are relegended to represent a standard 12-button telephone keypad.

25. A user interface device for use with first digitally controlled telephony apparatus, the user interface device comprising:
a microphone;
a speaker;
a first key pad;
second telephony apparatus coupled to the microphone, the speaker, and the first key pad for performing telephony functions independently of the first apparatus;
a second keypad with at least 12 relegendable buttons; and
an interface between the second keypad, the speaker, the microphone, and the first apparatus, the interface including
a button selection indicator for providing a digital indication from the user interface device to the first apparatus that a manipulation by the user has selected a given one of the buttons on the second keypad,
a legend indication receiver for receiving digital indications of legends for the buttons from the first apparatus and providing them to the second keypad, and
a failure indication receiver for receiving an indication of failure of the first apparatus from the first apparatus and responding thereto by disabling the second keypad.

26. The user interface device set forth in claim 25 wherein:

the second telephony apparatus is powered by the telephone system.

27. The user interface device set forth in claim 25 wherein the failure indication receiver comprises:

apparatus that responds to the failure indication by ceasing to provide the indication that a manipulation by the user has selected a given one of the buttons to the first apparatus.

28. The user interface device set forth in claim 27 wherein the failure indication receiver further comprises:

apparatus that further responds to the failure indication by causing the buttons of the second keypad to cease displaying the legends.

29. An interface module for use in a computer system which includes apparatus that operates under software control to perform telephony functions, the interface module being employed with a user interface device that includes at least a keypad with at least 12 relegendable buttons and the interface module comprising:
apparatus for receiving bit maps for legends on the buttons from the software and providing the bit maps to the user interface device; and
apparatus for receiving an indication from the user interface device that a user has manipulated a given button of the keypad and providing the indication to the software, the software responding thereto by providing the bit maps and/or performing one or more of the telephony functions.

30. The interface module set forth in claim 29 and further comprising:

apparatus for detecting a failure in of the computer system and responding thereto by sending an indication to the user interface device that the computer system has failed, the user interface device responding thereto by inhibiting the keypad.

31. The interface module set forth in claim 29 and further comprising:

locking apparatus for inhibiting operation of the interface module until a predefined sequence of inputs has been received in the interface module from the software.

* * * * *